(12) United States Patent
Tajima et al.

(10) Patent No.: US 9,787,378 B2
(45) Date of Patent: Oct. 10, 2017

(54) TERMINAL APPARATUS, BASE STATION APPARATUS, AND METHOD FOR SHARING CODEBOOK IN COMMUNICATION SYSTEM

(71) Applicant: NEC Corporation, Tokyo (JP)

(72) Inventors: Shinichi Tajima, Tokyo (JP); Naoto Ishii, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/764,736

(22) PCT Filed: Jan. 27, 2014

(86) PCT No.: PCT/JP2014/000397
§ 371 (c)(1),
(2) Date: Jul. 30, 2015

(87) PCT Pub. No.: WO2014/119276
PCT Pub. Date: Aug. 7, 2014

(65) Prior Publication Data
US 2015/0372729 A1     Dec. 24, 2015

(30) Foreign Application Priority Data

Jan. 31, 2013   (JP) .................................. 2013-017338

(51) Int. Cl.
*H04B 7/02* (2017.01)
*H04B 7/0456* (2017.01)
(Continued)

(52) U.S. Cl.
CPC ......... *H04B 7/0456* (2013.01); *H04B 7/0478* (2013.01); *H04B 7/0617* (2013.01);
(Continued)

(58) Field of Classification Search
CPC .. H04B 7/0639; H04B 7/0626; H04B 7/0456; H04B 7/0417; H04B 7/0478;
(Continued)

(56) References Cited

U.S. PATENT DOCUMENTS

| | | | |
|---|---|---|---|
| 2011/0110339 A1 | 5/2011 | Jeong et al. | |
| 2011/0194638 A1* | 8/2011 | Erell ................... | H04B 7/0417 375/267 |

(Continued)

FOREIGN PATENT DOCUMENTS

| | | |
|---|---|---|
| EP | 2 360 853 A2 | 8/2011 |
| EP | 2 568 620 A1 | 3/2013 |

(Continued)

OTHER PUBLICATIONS

International Search Report corresponding to PCT/JP2014/000397, dated Mar. 11, 2014 (5 pages).

(Continued)

*Primary Examiner* — Leila Malek
(74) *Attorney, Agent, or Firm* — Wilmer Cutler Pickering Hale and Dorr LLP

(57) ABSTRACT

A communication system, a terminal apparatus, a base station apparatus, and a method for sharing a codebook are provided that make it possible to improve system capacity by using precoding according to a cell environment. In a communication system in which beam directivity control is performed by precoding using a codebook that is common between a base station (10) and a terminal (20), the base station (10) notifies the terminal (20) information for codebook determination k including cell (11)-specific information on the base station, and the base station (10) and the terminal (20) generate the common codebook based on the information for codebook determination.

12 Claims, 31 Drawing Sheets

EXEMPLARY EMBODIMENT

(51) Int. Cl.
*H04B 7/04* (2017.01)
*H04B 7/06* (2006.01)
*H04B 7/08* (2006.01)
*H04W 88/02* (2009.01)
*H04W 88/08* (2009.01)

(52) U.S. Cl.
CPC ............ *H04B 7/0639* (2013.01); *H04B 7/086* (2013.01); *H04W 88/02* (2013.01); *H04W 88/08* (2013.01)

(58) Field of Classification Search
CPC ................ H04B 7/0617; H04B 7/0632; H04L 25/03343; H04W 72/042; H04W 88/08; H04W 88/02
USPC .......... 375/267, 295, 219; 370/252; 455/561
See application file for complete search history.

(56) References Cited

U.S. PATENT DOCUMENTS

| | | | |
|---|---|---|---|
| 2012/0281783 A1 | 11/2012 | Cheng et al. | |
| 2013/0051487 A1 | 2/2013 | Liu et al. | |
| 2013/0272250 A1* | 10/2013 | Shimezawa | H04B 7/063 370/329 |

FOREIGN PATENT DOCUMENTS

| | | |
|---|---|---|
| WO | WO-2011/059221 A2 | 5/2011 |
| WO | WO-2011/137591 A1 | 11/2011 |
| WO | WO-2012/090851 | * 7/2012 |
| WO | WO-2012/090851 A1 | 7/2012 |
| WO | WO-2012/151143 A1 | 11/2012 |
| WO | WO-2014/119276 A1 | 8/2014 |

OTHER PUBLICATIONS

3GPP TS 36.211 V9.1.0 (Mar. 2010), "3rd Generation Partnership Project; Technical Specification Group Radio Access Network; Evolved Universal Terrestrial Radio Access (E-UTRA); Physical Channels and Modulation (Release 9)", (85 pages).

Hoshino, et al., "Throughout Improving in Cellular Mobile Communications with Various Cell Sizes—Vertical Plane Beam Control with Pre-Coding and Cooperative MIMO Transmission," IEICE Technical Report, RCS2012-16 (2012), pp. 91-96.

Intel Corporation, Scenarios for 3D-MIMO and FD-MIMO [online], 3GPP TSG-RAN WG1#72 R1-130089, St. Julian's Malta, Jan. 28-Feb. 1, 2013, pp. 1-3, URL:http:www.3gpp.org/ftp/tsg_ran/WG1_RL1/TSGR1_72/Docs/R1-130089.zip.

Extended European Search Report issued by the European Patent Office for Application No. 14746286.5 dated Jul. 11, 2016 (10 pages).

Hoshino, K. and Fujii, T., "Improving Throughput by Multi-cell Coordinated Vertical Plane Beam Control with Pro-coding," IEEE 75th Vehicular Technology Conference, Yokohama, Japan, pp. 1-5 (May 6-9, 2012).

\* cited by examiner

INTERVAL BETWEEN BEAM-IRRADIATION LOCATIONS WHEN BASE STATION IS HIGH IN HEIGHT

INTERVAL BETWEEN BEAM-IRRADIATION LOCATIONS WHEN BASE STATION IS LOW IN HEIGHT

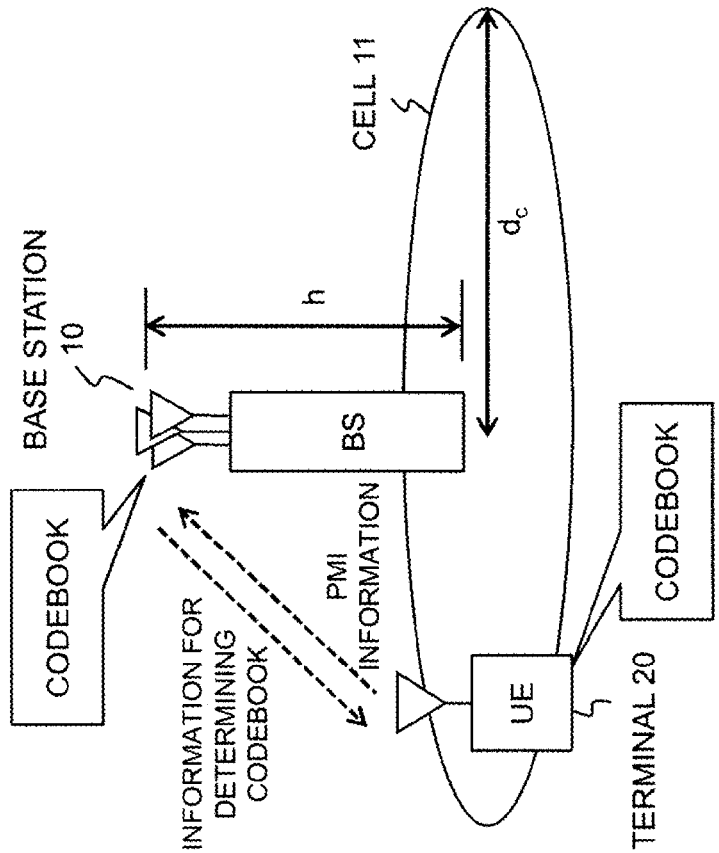

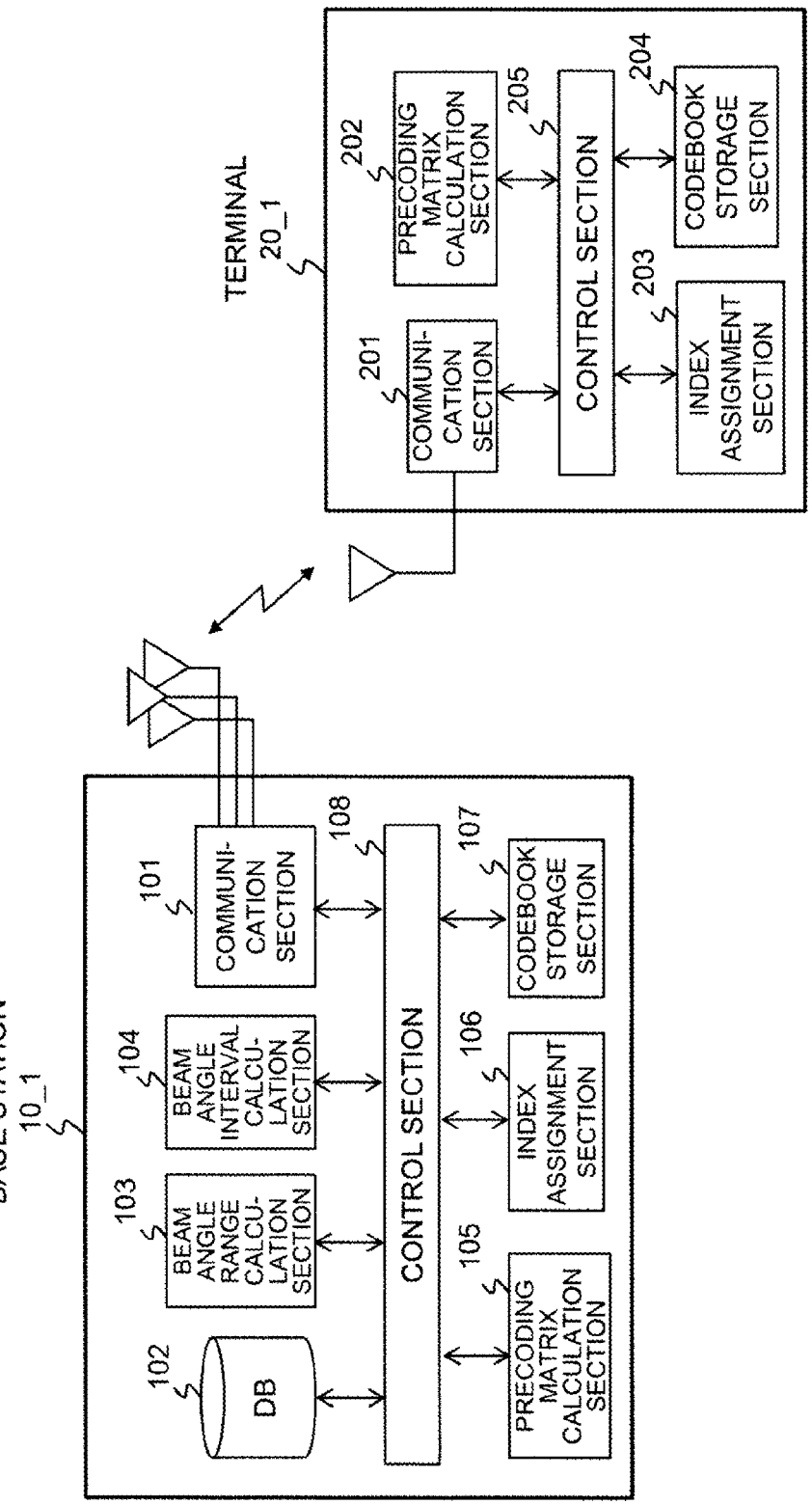

FOURTH EXAMPLE

FIFTH EXAMPLE

FIG. 13

SUPERSET TABLE

| BEAM ANGLE φ | INDEX | PRECODING MATRIX V |
|---|---|---|
| $\varphi_0$ | 0 | $V_0$ |
| ... | ... | ... |
| $\varphi_{Nsuper-1}$ | Nsuper - 1 | $V_{Nsuper-1}$ |

SIXTH EXAMPLE

EIGHTH EXAMPLE

FIG. 21 NINTH EXAMPLE

TENTH EXAMPLE

ELEVENTH EXAMPLE

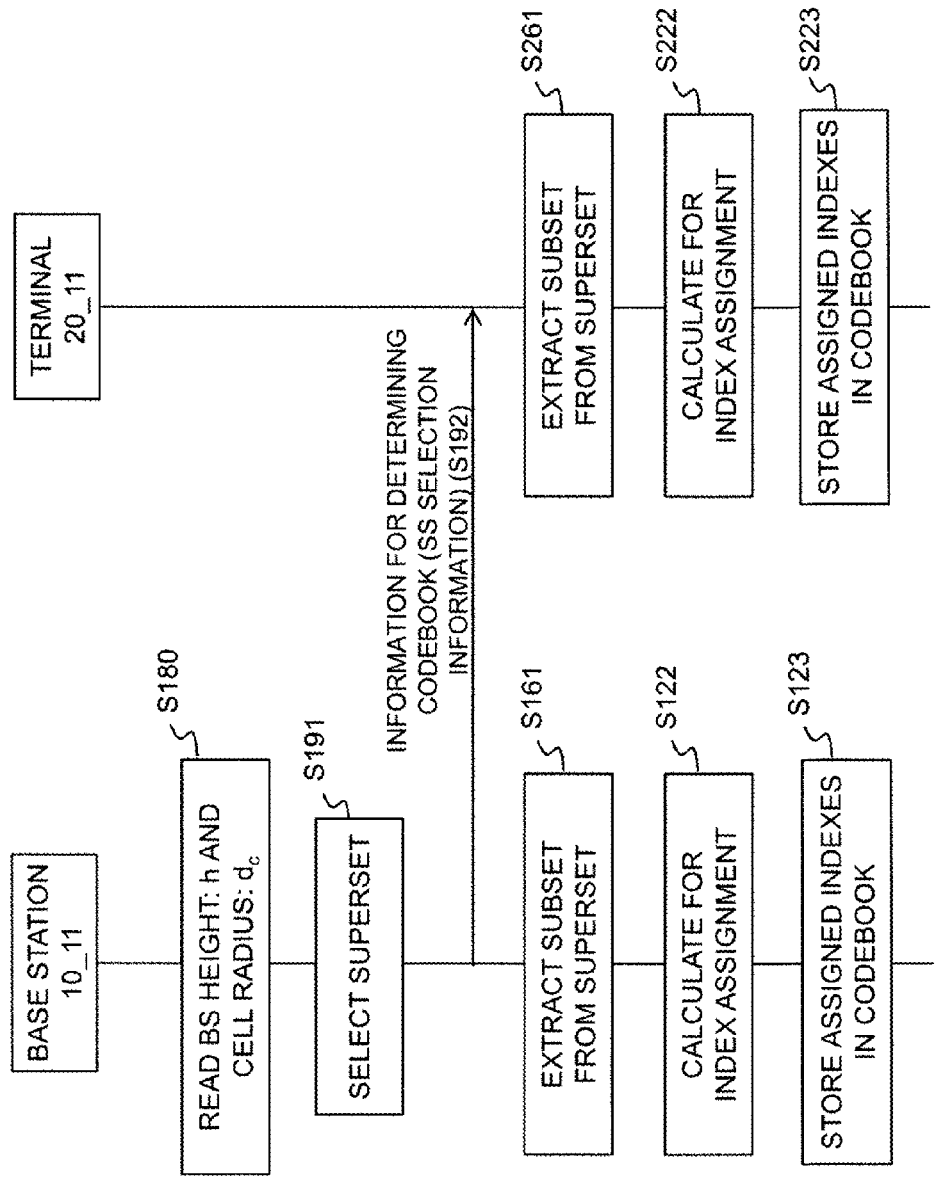

TERMINAL APPARATUS, BASE STATION APPARATUS, AND METHOD FOR SHARING CODEBOOK IN COMMUNICATION SYSTEM

CROSS-REFERENCE TO RELATED APPLICATIONS

This application is a national stage application of International Application No. PCT/JP2014/000397 entitled "Terminal Apparatus, Base Station Apparatus, and Method for Sharing Codebook in Communication System," filed on Jan. 27, 2014, which claims the benefit of the priority of Japanese Patent Application No. 2013-017338, filed on Jan. 31, 2013, the disclosures of each of which are hereby incorporated by reference in their entirety.

TECHNICAL FIELD

The present invention relates to a communication system using precoding and, more particularly, to a terminal apparatus, a base station apparatus, and a method for sharing a codebook in a communication system.

BACKGROUND ART

Consideration will be given of downlink transmission from a base station to a terminal in Multiple Input Multiple Output (MIMO) communication in which multiple antennas are disposed on both sending and receiving sides. In MIMO communication in closed-loop systems, a base station carries out beamforming based on channel information fed back from a terminal, thereby improving communication quality and system capacity. For example, in Frequency Division Duplexing (FDD) systems, since uplink and downlink channel responses differ from each other and are unknown, channel information estimated by a terminal is fed back to a base station when transmission beamforming is carried out.

However, direct feedback of channel information causes heavy loads on a network. For example, in a MIMO system where a transmitter has N antennas and a receiver has M antennas, channels between the transmitter and the receiver are the values of N×M complex numbers, resulting in the increased amount of feedback information. Therefore, a feedback method using a codebook is employed to reduce the amount of feedback information. According to this method, a table of precoding matrixes (a codebook) is shared beforehand between a terminal and a base station, and the terminal feeds back the base station with, as channel information, an index to a most relevant precoding matrix based on an estimated downlink channel response. Such an index in the codebook is referred to as Precoding Matrix Indicator (PMI). The base station, based on a fed back PMI, determines a precoding matrix from the codebook and multiplies a transmission signal by it, whereby it is possible to control beamforming for each terminal.

For beamforming in horizontal direction, it is possible to perform codebook-based beamforming over an entire cell coverage by using, for example, a precoding matrix as described in NPL 1.

For beamforming in vertical direction, it is possible to calculate a precoding matrix that realizes a desired beam angle in vertical direction, as described in NPL 2. Here, a beam angle in vertical direction is defined as an angle at which a base station looks down in the direction of the main beam of a beam realized by a precoding matrix.

CITATION LIST

Non-Patent Literature

[NPL 1]
3GPP TS 36.211 V9.1.0 (2010-03): "3rd Generation Partnership Project; Technical Specification Group Radio Access Network; Evolved Universal Terrestrial Radio Access (E-UTRA); Physical Channels and Modulation" (pp. 50-51)

[NPL 2]
"Throughput Improving in Cellular Mobile Communications with Various Cell Sizes—Vertical Plane Beam Control with Pre-coding and Cooperative MIMO Transmission", IEICE Technical Report, RCS2012-16, pp. 91-96, 2012 (pp. 92-93)

SUMMARY OF INVENTION

Technical Problem

However, according to the beamforming in vertical direction described in NPL 2, a cell environment such as the height of a base station and the radius of a cell, or obstacles around the base station and the distribution of neighbor cells, greatly affects communication quality and system capacity. Accordingly, the improvement of system capacity achieved through beamforming is restricted even if a cell-common codebook as described in NPL 1 is simply extended and used as a codebook for beamforming in vertical direction. A codebook is determined depending on the intervals between beam angles (hereinafter, referred to as beam angle interval) and the range of beam angles (hereinafter, referred to as beam angle range) realized by precoding matrixes. Therefore, a description will be given below of problems caused by the setting of a beam angle range and by the setting of a beam angle interval, individually.

Regarding the beam angle range, in horizontal-plane beamforming, the horizontal-plane angle of a cell coverage viewed from the plane of a base station is constant regardless of the height of the base station, whereas in vertical-plane beamforming, the vertical-plane angle of a cell coverage viewed from a base station varies depending on the height of the base station. Accordingly, if beams are prepared using a fixed vertical-plane angle without considering the height of a base station and the radius of a cell, then, for example, part of beams from a base station installed on a high-rise go toward the outside of the cell coverage, but a base station installed on a low-rise projects beams only onto a partial area in the beam coverage. It is apparent that a beam toward the outside of the cell coverage does not contribute to the improvement of system capacity amid the situation where there are limitations on the amount of feedback information, and even may increase inter-cell interference. Moreover, when beamforming is intended for all terminals located on the ground plane in the cell coverage, but if beams are projected only onto a partial area in the beam coverage, then terminals that can acquire gains from the beamforming are limited, similarly resulting in no contribution being made to the improvement of system capacity. Conversely, in an environment where many obstacles to radio waves such as buildings exist around a base station, or an environment where neighbor cells are densely present, it is preferable to make the vertical-plane angle larger so that beams will be projected only onto a required area in the beam coverage.

Regarding the beam angle interval, in horizontal-plane beamforming, beams have the same path loss conditions because each beam has an equal distance between its main beam-irradiation location on the ground plane and a base station. Accordingly, optimal beam arrangement to mitigate a decline in received signal intensity characteristics achieved by a plurality of beams is to arrange the beams in such a manner that the irradiation locations of the beams on the ground plane will be at equidistant intervals (NPL 1).

On the other hand, in vertical-plane beamforming, since each beam provides a different received intensity characteristic, the preparation of beams at equidistant intervals is not always optimal beam arrangement. For example, referring to FIG. 1A, even if beam-irradiation locations L1 to L3 on the ground plane are at equal intervals, the effects of a path loss vary with each beam because the distance between the main beam-irradiation location on the ground plane and the base station varies with each beam. Moreover, referring to FIG. 1B, in comparison with horizontal-plane beamforming, received signal intensity characteristics become less strong, and differences in intensity between the beams narrow accordingly. Furthermore, referring to FIG. 1C, even by using the same beam angle, the interval between beam-irradiation locations varies depending on the irradiation location of a beam in the cell, that is, the distance from the base station.

Further, referring to FIGS. 2A and 2B, if base stations have different heights, the interval between beam-irradiation locations varies even when their beams have the same beam angle. That is, an interval L4-L5 between beam-irradiation locations produced by the higher base station shown in FIG. 2A is wider than an interval L6-L7 between beam-irradiation locations produced by the lower base station shown in FIG. 2B.

As described above, in a system having the limited size of a feedback, if a cell-common codebook is uniformly applied to beamforming in vertical direction without considering differences in cell environment, the received power characteristics realized by beams in part of an area have no great differences. If the received power characteristics have no great differences as described above, selectable options in beam control are substantially limited, and the improvement of system capacity is restricted. Further, if a cell-common codebook is uniformly applied to beamforming in vertical direction, the intervals between main beam-irradiation locations become larger as a base station irradiates remoter areas (the beam angle in vertical direction becomes smaller), resulting in the creation of an area where sufficient beam gains cannot be acquired, as well as an increase in inter-cell interference. Accordingly, those terminals that are remote from any beam-irradiation locations cannot acquire gains from beamforming, and consequently the improvement of system capacity is restricted.

Accordingly, an object of the present invention is to provide a communication system, a terminal apparatus, a base station apparatus, and a method for sharing a codebook that make it possible to improve system capacity by using precoding according to a cell environment.

Solution to Problem

A communication system according to the present invention is a communication system in which beam directivity control is performed by precoding using a codebook that is common between a base station and a terminal, characterized in that the base station notifies the terminal of information for codebook determination including cell environment information on the base station, and the base station and the terminal generate the common codebook based on the information for codebook determination.

A terminal apparatus according to the present invention is a terminal apparatus in a communication system in which beam directivity control is performed by precoding using a codebook, characterized by comprising: communication means that receives from a base station information for codebook determination including cell environment information on the base station; and codebook generation means that generates the codebook in common with the base station based on the information for codebook determination.

A base station apparatus according to the present invention is a base station apparatus in a communication system in which beam directivity control is performed by precoding using a codebook, characterized by comprising: communication means that sends information for codebook determination including cell environment information on the base station apparatus to a terminal; and codebook generation means that generates the codebook in common with the terminal based on the information for codebook determination.

A codebook sharing method according to the present invention is a codebook sharing method in a communication system in which beam directivity control is performed by precoding using a codebook that is common between a base station and a terminal, characterized in that: the base station notifies the terminal of information for codebook determination including cell environment information on the base station; and the base station and the terminal generate the common codebook based on the information for codebook determination.

A codebook sharing method according to the present invention is a codebook sharing method in a communication system in which beam directivity control is performed by precoding using a codebook, characterized by comprising: receiving from a base station information for codebook determination including cell environment information on the base station; and generating the codebook in common with the base station based on the information for codebook determination.

A codebook sharing method according to the present invention is a codebook sharing method in a communication system in which beam directivity control is performed by precoding using a codebook, characterized by comprising: sending information for codebook determination including cell environment information on a base station of interest to a terminal; and generating the codebook in common with the terminal based on the information for codebook determination.

Advantageous Effects of Invention

As described above, according to the present invention, information for codebook determination including cell environment information is notified from a base station side to a terminal side, and the base station and the terminal generate a common codebook based on the information for codebook determination, whereby precoding according to the cell environment is performed, and thus the improvement of system capacity can be achieved.

BRIEF DESCRIPTION OF DRAWINGS

FIG. 3A is a schematic diagram of a base station and its cell in a wireless communication system according to an exemplary embodiment of the present invention, and FIG. 3B is a diagram showing an example of a codebook in the present exemplary embodiment.

FIG. 4 is a block diagram showing configurations of a base station and a terminal in a wireless communication system according to a first example of the present invention.

FIG. 13 is a diagram showing an example of a superset table in the fifth example.

FIG. 31 is a schematic flowchart for describing system operations in the eleventh example shown in FIG. 30.

DESCRIPTION OF EMBODIMENTS

Figure 1C:
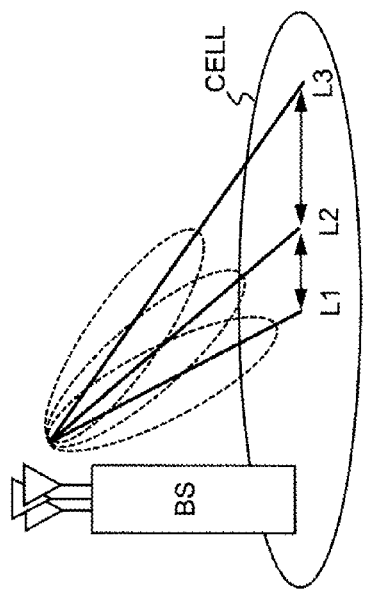
FIG. 1C is a schematic diagram showing a case where beam angle intervals are equal in vertical-plane beamforming.
Figure 1A:
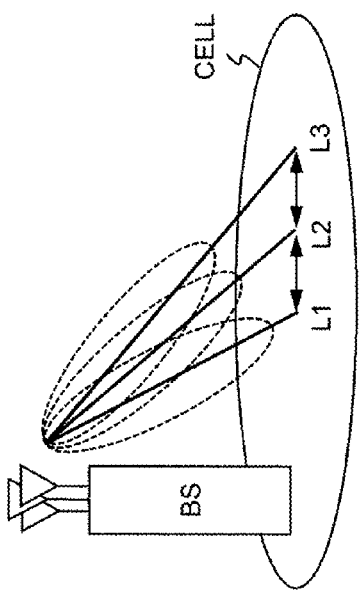
FIG. 1A is a schematic diagram showing a case where beam-irradiation locations are at equal intervals in vertical-plane beamforming.
Figure 1B:
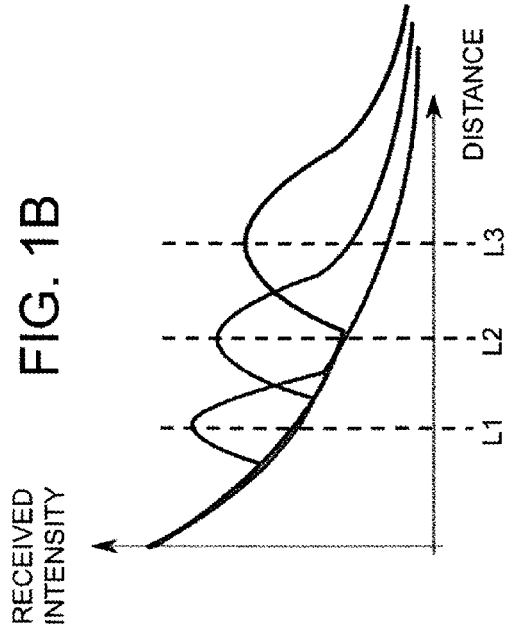
FIG. 1B is a graph showing received intensity characteristics realized by the beams in FIG. 1A.
Figure 2A:
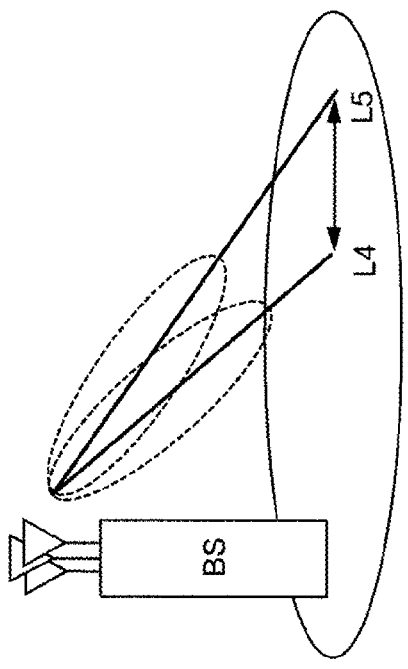
FIG. 2A is a schematic diagram showing an interval between beam-irradiation locations in case of a base station of a higher height.
Figure 2B:
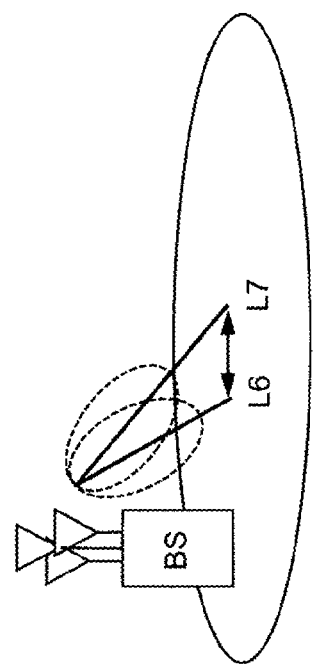
FIG. 2B is a schematic diagram showing an interval between beam-irradiation locations in case of a base station of a lower height.

First, referring to FIG. 3A, it is assumed that h is the height of transmission antennas of a base station 10 from the ground (cell surface), and $d_c$ is the distance on the cell surface between the base station 10 and an edge of a cell 11 (hereinafter, for convenience, referred to as cell radius). According to an exemplary embodiment of the present invention, when a terminal 20 communicating with the base station 10 receives information for codebook determination including cell environment information from the base station 10, the terminal 20 generates cell-specific precoding matrixes based on that information and determines a codebook as illustrated in FIG. 3B. A codebook in the present exemplary embodiment is not a single fixed codebook but is a codebook reflecting each cell environment. Using such a cell-specific codebook, the terminal 20 feeds back a codebook index (PMI) as channel information to the base station 10. Note that the size of a feedback is assumed to be Nfb here.

In case where a codebook reflecting a cell environment is shared between a base station and a terminal, the base station notifies a cell-specific parameter as information for codebook determination to the terminal, and the terminal determines the codebook including precoding matrixes that are calculated based on the cell-specific parameter, which will be described in examples below. Thus, a codebook including no redundant precoding matrixes can be shared, and the improvement of system capacity can be achieved.

Note that any information reflecting a cell environment will suffice for a cell-specific parameter, for which cell environment information such as the height h of the base station 10 and the cell radius $d_c$, beam angle information on beam angles and/or a beam angle interval depending on such a cell environment, and the like can be used, which will be described later. Moreover, the cell environment information such as the height h of the base station 10 and the cell radius $d_c$ may be values that are predetermined depending on a cell environment such as obstacles to radio waves existing around the base station 10 and the distribution of neighbor cells. Further, the beam angle information may depend not only on the base station height h and cell radius $d_c$ but also on an environment specific to the cell of interest, such as obstacles to radio waves around the base station and the distribution of neighbor cells, or a limitation on a beam-projected area to avoid inter-cell interference. Hereinafter, examples of the present invention will be described in detail with reference to drawings.

1. First Example 1.1) System Structure

Referring to FIG. 4, configurations of a base station 10_1 and a terminal 20_1 in a radio communication system according to a first example of the present invention are as follows.

<Base Station>

The base station 10_1 includes a communication section 101 for communicating with the terminal 20_1, a database 102, a beam angle range calculation section 103, a beam angle interval calculation section 104, a precoding matrix calculation section 105, an index assignment section 106, a codebook storage section 107, and a control section 108. The beam angle range calculation section 103 and beam angle interval calculation section 104 generate beam angle information, and the precoding matrix calculation section 105 and index assignment section 106 generate a codebook to be shared, which will be described later.

The database 102 stores cell environment information, which includes a cell radius $d_c$, a base station height h, and a PMI feedback size Nfb [bit], and further includes obstacles around the base station, the distribution of neighbor cells and the like as necessary. The cell radius $d_c$ may be defined as the radius of an area where a logical value of received signal intensity calculated based on transmission power, a propagation model, or a beam pattern model is equal to or larger than a certain value, or may be defined as the maximum or average value of distances between the location of the base station and cell edges of the cell coverage estimated at the time of designing a cell. The base station height h and PMI feedback size Nfb are set at the time of installation or system requirement.

The beam angle range calculation section 103 calculates a beam angle range by receiving the cell radius $d_c$ and base station height h as inputs from the database 102, while the beam angle interval calculation section 104 calculates a beam angle interval $\Delta\phi$ by using the beam angle range $\phi r$ from the beam angle range calculation section 103 and the PMI feedback size Nfb from the database 102. The calculation of the beam angle range $\phi r$ and beam angle interval $\Delta\phi$ will be described later.

The precoding matrix calculation section 105 receives the beam angle interval $\Delta\phi$ and beam angle range $\phi r$ from the beam angle interval calculation section 104 and beam angle range calculation section 103, respectively, and calculates precoding matrixes Vi. The index assignment section 106 assigns predetermined indexes to a group of precoding matrixes for a codebook, which is input from the precoding matrix calculation section 105. The control section 108 stores this group of precoding matrixes and the assigned indexes as a codebook in the codebook storage section 107.

The control section 108 performs communication control according to the present example and also controls the above-described functional sections (101 to 107), thereby sending to the terminal 20_1 the beam angle range $\phi r$ calculated by the beam angle range calculation section 103 and the beam angle interval $\Delta\phi$ calculated by the beam angle interval calculation section 104 as information for codebook determination.

<Terminal>

The terminal 20_1 includes a communication section 201 for communicating with the base station 10_1, a precoding matrix calculation section 202, an index assignment section 203, a codebook storage section 204, and a control section 205. The precoding matrix calculation section 202 and index assignment section 203 generate a codebook to be shared, which will be described later.

The control section 205 performs communication control according to the present example. That is, when receiving cell-specific parameters (beam angle information: the beam angle range $\phi r$ and beam angle interval $\Delta\phi$) from the base station 10_1 through a broadcast channel or dedicated channel, the precoding matrix calculation section 202 calculates the precoding matrixes Vi based on the beam angle interval $\Delta\phi$ and beam angle range $\phi r$, and the index assignment section 203 assigns predetermined indexes to the group of precoding matrixes for the codebook calculated. Then, the control section 205 stores the group of precoding matrixes and the indexes as a codebook in the codebook storage section 204. The respective precoding matrix calculation sections (105, 202), index assignment sections (106, 203), and codebook storage sections (107, 204) of the base station 10_1 and the terminal 20_1 perform basically the same processing.

1.2) Operations

Figure 5:
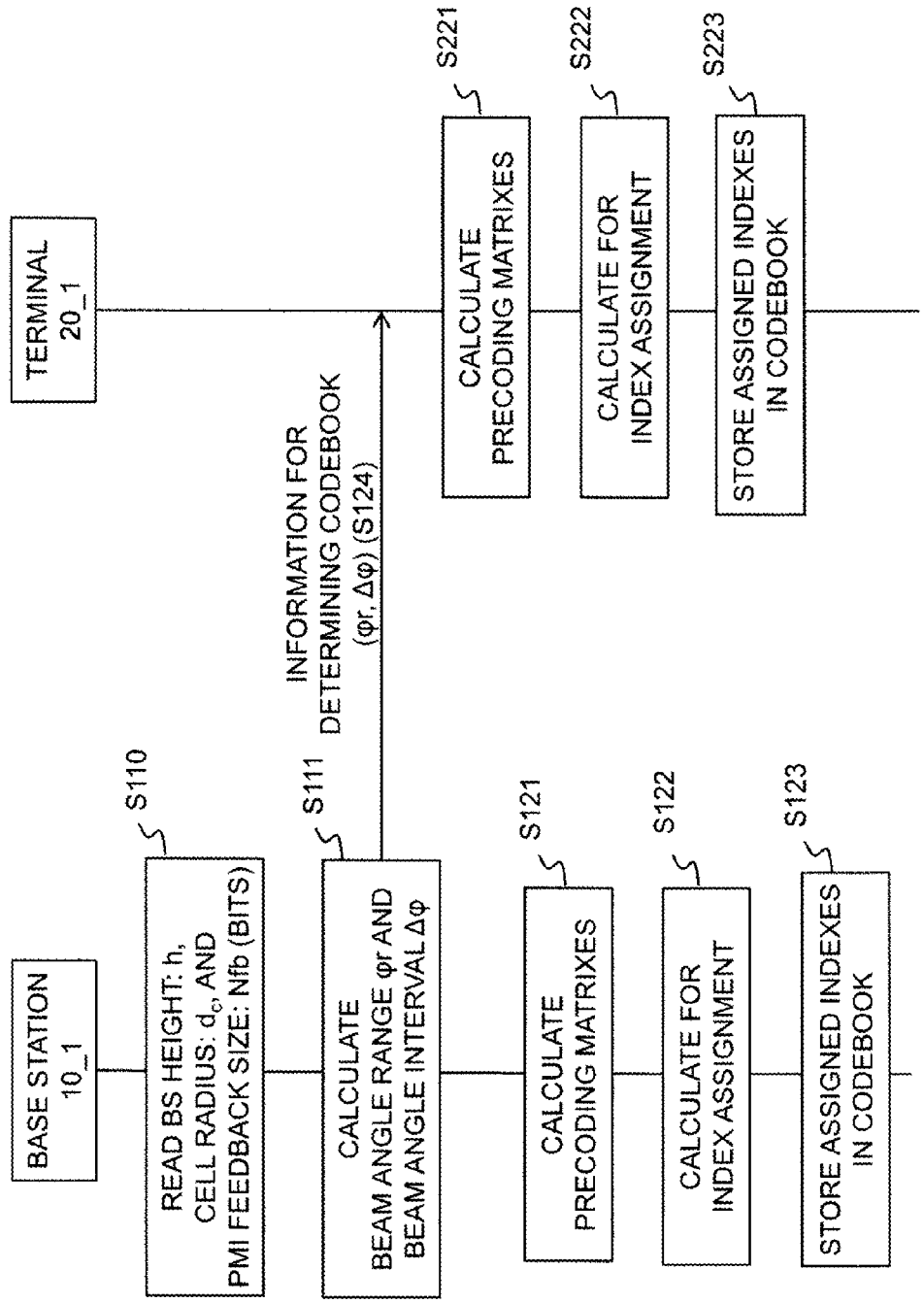
FIG. 5 is a schematic flowchart for describing system operations in the first example shown in FIG. 4.

Next, operations of the base station and the terminal in the present example will be described with reference to FIG. 5.

The control section 108 of the base station 10_1 generates a codebook through an under-mentioned procedure and stores it in the codebook storage section 107 when the base station is installed. Thereafter, a codebook may be regenerated at constant intervals or when a change has occurred in the cell environment or system requirements.

<Calculation of Beam Angle Range $\phi r$ and Beam Angle Interval $\Delta\phi$>

First, the control section 108 reads the cell radius $d_c$, base station height h, and PMI feedback size Nfb, which are cell environment information on the base station 10_1, from the database 102 (Operation S110) and controls the beam angle range calculation section 103 and beam angle interval calculation section 104 to calculate the beam angle range $\phi r$ and beam angle interval $\Delta\phi$ (Operation S111). A specific calculation procedure is as follows.

The beam angle range calculation section 103 calculates the beam angle range $\phi r$ by using the cell radius $d_c$ and base station height h acquired from the database 102. The beam angle range $\phi r$ is expressed by using a lower limit value $\phi_{min}$ and an upper limit value $\phi_{max}$ of beam angle ($\phi r = \phi_{max} - \phi_{min}$). It is assumed that $\phi_{max}$ is a fixed value $\pi/2$, whereas $\phi_{min}$ is calculated by using the following equation (1) where $\phi$ is a Greek alphabet phi:

[Math. 1]

$$\phi_{min} = \arctan\left(\frac{h}{d_c}\right). \tag{1}$$

If the lower limit value $\phi_{min}$ of the beam angle range $\phi r$ is made to be an angle at which the base station 10_1 looks down at an edge of the cell, all beams in the codebook are directed toward the inside of the cell coverage, and consequently it is possible to avoid a situation where no contribution is made to the improvement of system capacity. Note that although the beam angle range $\phi r$ may be defined within the range of consecutive values between the lower limit value $\phi_{min}$ and the upper limit value $\phi_{max}$, it may also be defined as a range of discrete values by specifying a plurality of beam angles.

Next, the beam angle interval calculation section 104 calculates the beam angle interval $\Delta\phi$ for arranging beams at equal intervals within the beam angle range by dividing the beam angle range $\phi r$ by a PMI feedback size of $2^{Nfb}-1$. The beam angle interval $\Delta\phi$ is calculated by using the following equation (2):

[Math. 2]
$$\Delta\phi = \frac{(\phi_{max} - \phi_{min})}{2^{N_{fb}} - 1} \quad (2)$$

This beam angle interval $\Delta\phi$ meets a feedback size condition (Nfb [bit]) with respect to the beam range $\phi r$ (=$\phi_{max}-\phi_{min}$).

<Calculation of Precoding Matrixes>

Subsequently, based on the beam angle range $\phi r$ and beam angle interval $\Delta\phi$, the precoding matrix calculation section 105 calculates a group of precoding matrixes {V} for a codebook that realizes these beam angle range and beam angle interval, through an under-mentioned calculation procedure (Operation S121).

First, a main beam angle $\phi i$ for each precoding matrix in a codebook is calculated by using the beam angle range $\phi r$ and beam angle interval $\Delta\phi$. An i-th main beam angle $\phi i$ is calculated by using the following equation (3):

[Math. 3]
$$\phi_i = \phi_{min} + \Delta\phi \cdot i, (i=0,1,\ldots 2^{N_{fb}}-1) \quad (3)$$

Subsequently, precoding matrixes Vi corresponding to the individual $\phi i$ are calculated. The vertical-plane directivity $g_a(\phi)$ of a beam corresponding to an arbitrary beam angle direction $\phi$ is calculated by using the following equation (4):

[Math. 4]
$$g_a(\phi) = \sum_{k=0}^{N_a-1} g_e(\phi) \cdot \exp\left( j\frac{2\pi k \, \Delta d \, \sin\phi}{\lambda} \right) \quad (4)$$

where $N_a$ is the number of antenna elements, $g_e(\phi)$ is the directivity of a beam formed by each antenna element, $\Delta d$ is the interval between antennas arranged at equal intervals, and $\lambda$ is a wavelength.

Moreover, when a precoding matrix $V=[1 \; \exp(jp)]^T$ in case of using a 2-element antenna and performing 1-layer transmission is applied, the vertical-plane directivity $g_p(\phi, p)$ is calculated by using the following equation (5). Note that $^T$ represents transpose, and p is a phase difference between the 0th and 1st antenna elements.

[Math. 5]
$$g_p(\phi,p) = g_a(\phi)\exp(jp) \quad (5)$$

Further, when precoding is applied, the vertical-plane power pattern $G_p(\theta, p)$ can be calculated by using the following equation (6):

[Math. 6]
$$G_p(\phi,p) = |g_p(\phi,p)|^2 \quad (6)$$

Using the equation (6) above, a precoding matrix $V_i$ that realizes an arbitrary beam angle $\phi_i$ can be obtained by using the following equation (7):

[Math. 7]
$$V_i = \begin{bmatrix} 1 \\ e^{jp_i} \end{bmatrix}, \; p_i = \arg\max_p G_p(\phi_i, p) \; (i = 0, 1, \cdots, N_{fb} - 1) \quad (7)$$

<Index Assignment>

Next, the index assignment section 106 assigns i, as codebook indexes, to the group of precoding matrixes $V_i$ (i=0, 1, . . . , $2^{Nfb}-1$) acquired from the precoding matrix calculation section 105 (Operation S122), and a result of this assignment is stored in the codebook storage section 107 (Operation S123).

In this manner, indexes are assigned to a cell-specific codebook for each cell, whereby the number of bits of a binary number which represents an index pointing an arbitrary precoding matrix in the codebook, is not larger the prescribed PMI feedback size Nfb.

<Notification of Information for Determining Codebook>

The control section 108 notifies information for codebook determination including the above-described beam angle range $\phi r$ and beam angle interval $\Delta\phi$ to the terminal 20_1 in the own cell via the communication section 101 (Operation S124). For a notification method, notification may be performed by using a broadcast channel (PBCH: Physical Broadcast CHannel) for notifying all terminals in the cell, or may be made individually to a terminal that is requesting a connection to the own cell.

<Codebook Generation on Terminal Side>

When receiving the information for codebook determination from the base station 10_1 via the communication section 201, the control section 205 of the terminal 20_1 controls the precoding matrix calculation section 202 and index assignment section 203 to generate the codebook, as in Operations S121 to S123 on the base station 10_1 side. Specifically, the precoding matrix calculation section 202 uses the received beam angle range $\phi r$ and beam angle interval $\Delta\phi$ to calculate a group of precoding matrixes [V] for the codebook that realizes these beam angle range and beam angle interval in accordance with the above-described equations (3) to (7) (Operation S221). Subsequently, the index assignment section 203 assigns i, as codebook indexes, to the calculated group of precoding indexes $V_i$ (i=0, 1, . . . , $2^{Nfb}-1$) (Operation S222). The control section 205 stores a result of the assignment in the codebook storage section 204 (Operation S223).

In this manner, the same cell-specific codebook that is stored in the codebook storage section 107 of the base station 10_1 is stored in the codebook storage section 204 of the terminal 20_1. Once the codebook is determined, the control section 205 of the terminal 20_1 uses this codebook to feed back a codebook index (PMI) as channel information to the base station 10_1. The cell-specific codebook is generated such as to meet the PMI feedback size Nfb condition, as described already.

1.3) Effects

As described above, according to the first example of the present invention, the beam angle range $\phi r$ and beam angle interval $\Delta\phi$ calculated according to a cell environment are notified from the base station 10_1 to the terminal 20_1, whereby a codebook reflecting the cell environment can be shared between the base station and the terminal through similar processing. That is, an essential and minimal codebook that includes no redundant precoding matrixes, suits the cell environment, and meets the PMI feedback condition can be shared between the base station and the terminal, and thus enabling to improve system capacity.

2. Second Example

According to a second example of the present invention, the beam angle interval $\Delta\phi$ of a base station is stored beforehand as a fixed value in a database, whereby the beam angle interval calculation section can be omitted. Hereinafter, configurations and operations according to the second example will be described.

2.1) System Structure

Figure 6:
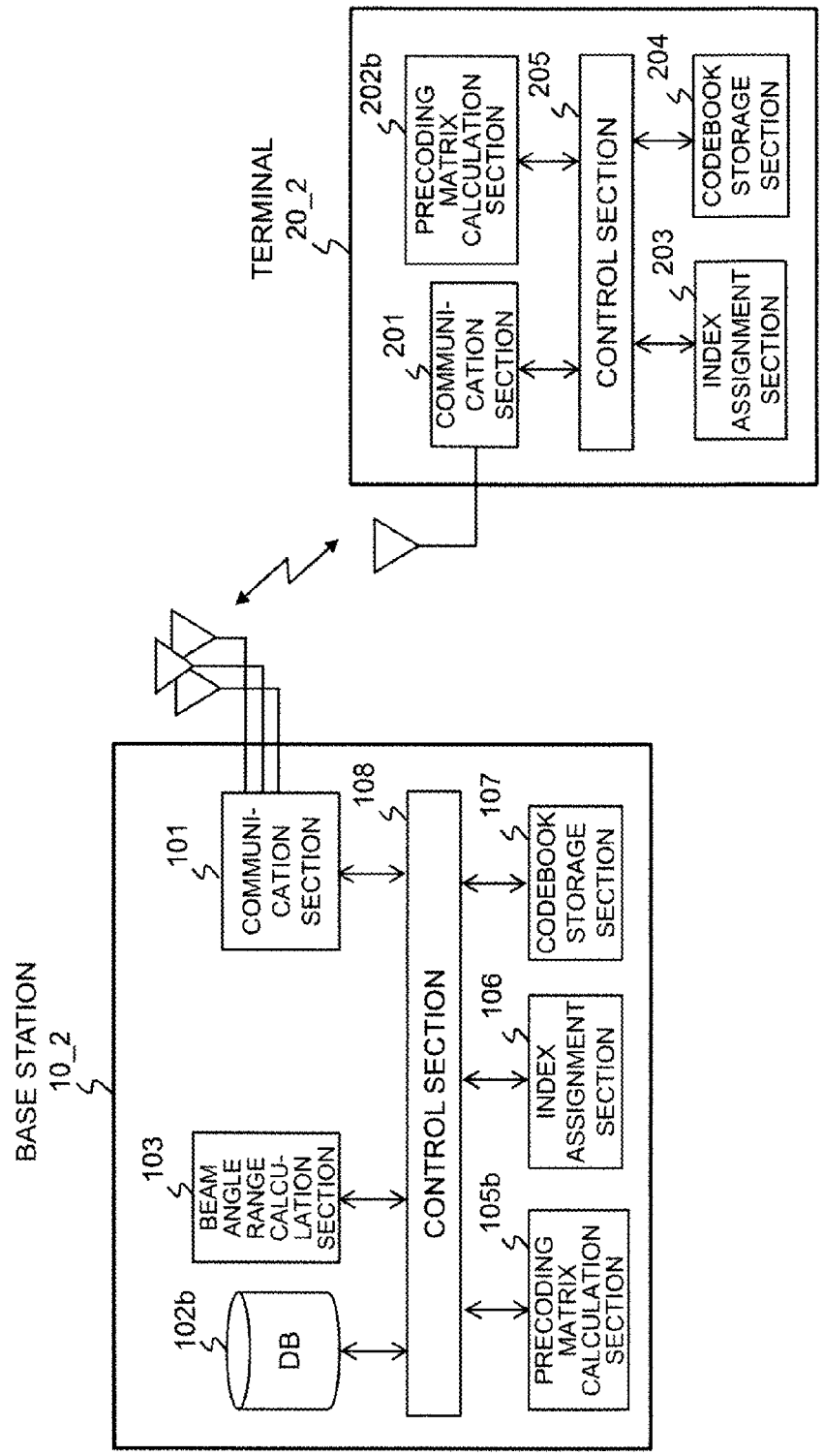
FIG. 6 is a block diagram showing configurations of a base station and a terminal in a wireless communication system according to a second example of the present invention.

Referring to FIG. 6, the configuration of a terminal 20_2 in a radio communication system according to the second example of the present invention is the same as that of the terminal 20_1 according to the first example, and therefore a description thereof will be omitted, giving the same reference numerals. The configuration of a base station 10_2 according to the present example is partially different from that of the base station 10_1 according to the first example, and therefore only the different structural parts will be described, giving the same reference numerals to the same blocks and omitting a description thereof.

A database 102b of the base station 10_2 stores a fixed value of beam angle interval $\Delta\phi$, which indicates a cell environment of the base station 10_2, in addition to a cell radius $d_c$, a base station height h, and a PMI feedback size Nfb [bit]. Accordingly, the base station 10_2 is in no deed of the beam angle interval calculation section 104 of the first example. The rest of the configuration is basically similar to that of the base station 10_1 according to the first example shown in FIG. 4, but the operation of the precoding matrix calculation section is partially different from the first example.

2.2) Operations

Next, operations of the base station and the terminal in the present example will be described with reference to FIG. 7.

The control section 108 of the base station 10_2 generates a codebook through an under-mentioned procedure and stores it in the codebook storage section 107 when the base station is installed. Thereafter, a codebook may be regenerated at constant intervals or when a change has occurred in the cell environment or system requirements.

<Calculation of Beam Angle Range $\phi r$>

First, the control section 108 reads the cell radius $d_c$, base station height h, PMI feedback size Nfb, and fixed value of beam angle interval $\Delta\phi$, which are cell environment information on the base station 10_2, from the database 102b (Operation S110b) and controls the beam angle range calculation section 103 to calculate the beam angle range $\phi r$ (Operation S111b). Its specific calculation procedure is as described in the first example.

<Calculation of Precoding Matrixes>

Subsequently, based on the calculated beam angle range $\phi r$ and the fixed value of beam angle interval $\Delta\phi$ read from the database 102b, a precoding matrix calculation section 105b calculates a group of precoding matrixes [V] for a codebook that realizes these beam angle range and beam angle interval, through the calculation procedure described in the first example (Operation S121b). However, since the beam angle interval $\Delta\phi$ is a fixed value, the precoding matrix calculation section 105b performs control to partially limit the codebook so that the PMI feedback size Nfb condition will be met. This is a difference from the first example.

Accordingly, a description hereinafter will be focused on this difference, and a description of the other operations will be omitted as they are similar to those of the first example.

When the number of the precoding matrixes in the calculated group of precoding matrixes for a codebook is not smaller than the PMI feedback size Nfb, the precoding matrix calculation section 105b deletes a beam that is the closest to the center of the cell, that is, a beam of the largest beam angle in vertical direction, from the group of precoding matrixes for a codebook. Then, the operation for deleting a precoding matrix is repeated until the number of the precoding matrixes in the precoding matrixes for a codebook becomes equal to the PMI feedback size.

When the group of precoding matrixes $V_i$ for a codebook is thus determined, then as in the first example thereafter, the index assignment section 106 assigns i, as codebook indexes, to the group of precoding matrixes $V_i$ acquired from the precoding matrix calculation section 105 (Operation S122), and a result of this assignment is stored in the codebook storage section 107 (Operation S123).

<Notification of Information for Determining Codebook>

The control section 108 notifies information for codebook determination including the calculated beam angle range $\phi r$ and the fixed value of beam angle interval $\Delta\phi$, to the terminal 20_2 in the own cell via the communication section 101 (Operation S124). For a notification method, notification may be performed by using a broadcast channel (PBCH: Physical Broadcast CHannel) for notifying all terminals in the cell, or may be made individually to a terminal that is requesting a connection to the own cell.

<Codebook Generation on Terminal Side>

When receiving the information for codebook determination from the base station 10_2 via the communication section 201, the control section 205 of the terminal 20_2 controls the precoding matrix calculation section 202 and index assignment section 203 to generate the codebook and stores it in the codebook storage section 204 (Operations S221b, S222, and S223), as in Operations S121b, S122, and S123 on the base station 10_2 side. At that time, the precoding matrix calculation section 202 performs control to partially limit the codebook so that the PMI feedback size Nfb condition will be met, as in Operation 121b on the base station side.

In this manner, the same cell-specific codebook that is stored in the codebook storage section 107 of the base station 10_2 is stored in the codebook storage section 204 of the terminal 20_2. Once the codebook is determined, the control section 205 of the terminal 20_2 uses this codebook to feed back a codebook index (PMI) as channel information to the base station 10_2. The cell-specific codebook is generated such as to meet the PMI feedback size Nfb condition, as described already.

Note that it is also possible that a plurality of different beam angle intervals $\Delta\phi$ are prepared in the database 102b, and when the PMI feedback size condition is not met as described above, a beam angle interval is changed to another, that is, the beam angle intervals are tried in turn from a narrower one to a wider one, and when the PMI feedback size condition is still not met, then the above-described deletion of a precoding matrix is performed.

2.3) Effects

The second example of the present invention, in addition to the effects of the first example, has the advantage that the beam angle interval processing section can be omitted by setting the beam angle interval $\Delta\phi$ at a fixed value, and therefore the apparatus configuration of the base station can be simplified.

3. Third Example

A third example of the present invention is different from the first example in that the terminal side generates a codebook based on a base station height h and a cell radius $d_c$ notified. Hereinafter, configurations and operations according to the third example will be described.

3.1) System Structure

Figure 8:
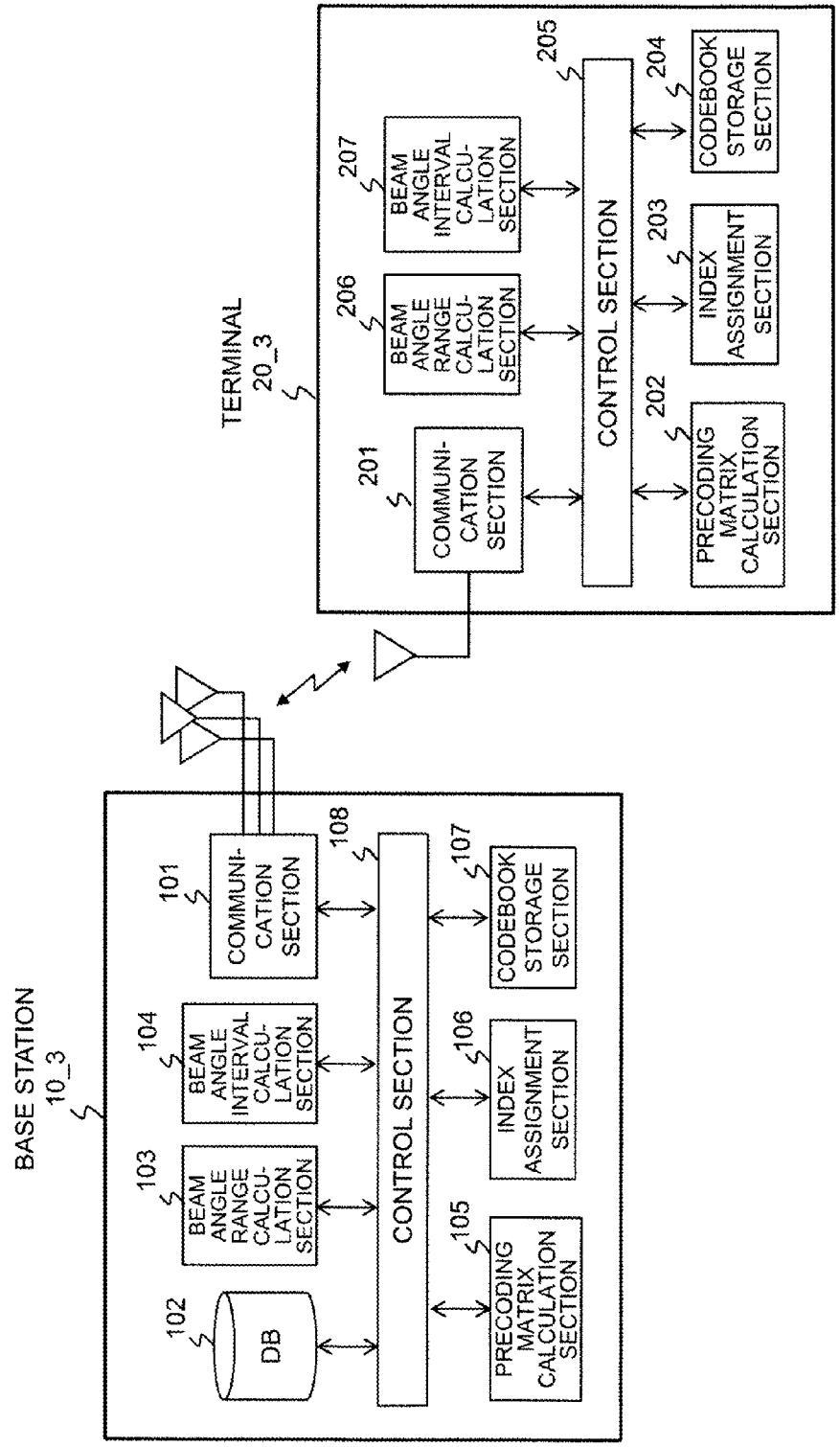
FIG. 8 is a block diagram showing configurations of a base station and a terminal in a wireless communication system according to a third example of the present invention.

Referring to FIG. 8, the configuration of a base station 10_3 according to the third example of the present invention is the same as that of the base station 10_1 according to the first example, and therefore a description thereof will be omitted, giving the same reference numerals. However, the base station 10_3 notifies a terminal 20_3 of information for codebook determination including a base station height h, a cell radius $d_c$, and a PMI feedback size Nfb, which is a difference. Accordingly, the terminal 20_3 according to the present example has the configuration of the terminal 20_1 according to the first example to which a beam angle range calculation section 206 and a beam angle interval calculation section 207 are added. The rest of the configuration is similar to that of the first example, and therefore a description will mainly be given to operations that are different from the first example, giving the same reference numerals to the same blocks as those of the first example.

3.2) Operations

Figure 9:
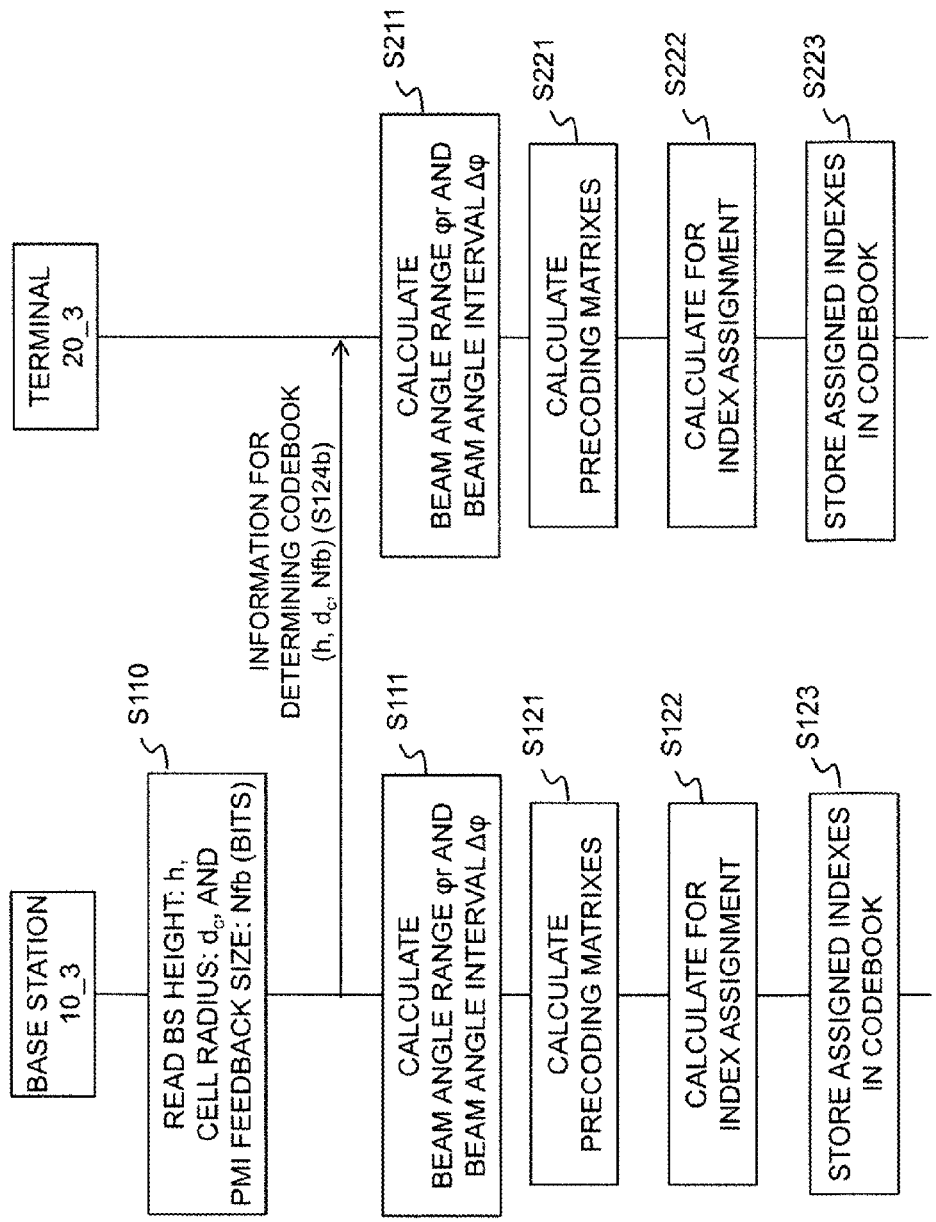
FIG. 9 is a schematic flowchart for describing system operations in the third example shown in FIG. 8.

Referring to FIG. 9, Operations S110 to S123 of the base station 10_3 are the same as those of the first example. However, the control section 108 notifies the base station height h, cell radius $d_c$, and PMI feedback size Nfb read from the database 102, as information for codebook determination, to the terminal 20_3 (Operation S124b).

When the terminal 20_3 receives the information for codebook determination including the base station height h, cell radius $d_c$, and PMI feedback size Nfb, the control section 205 of the terminal 20_3 controls the beam angle range calculation section 206 and beam angle interval calculation section 207 to calculate the beam angle range $\phi r$ and beam angle interval $\Delta\phi$ (Operation S211), as in Operation S111 on the base station 10_3 side. Subsequently, the control section 205 controls the precoding matrix calculation section 202 and index assignment section 203 to generate the codebook, as in Operations S121 to S123 on the base station 10_3 side. Specifically, using the calculated beam angle range $\phi r$ and beam angle interval $\Delta\phi$, the precoding matrix calculation section 202 calculates a group of precoding matrixes {V} for the codebook that realizes these beam angle range and beam angle interval in accordance with the above-mentioned equations (3) to (7) (Operation S221). Subsequently, the index assignment section 203 assigns i, as codebook indexes, to the calculated group of precoding matrixes $V_i$ (i=0, 1, . . . , $2^{Nfb-1}$) (Operation S222). The control section 205 stores a result of the assignment in the codebook storage section 204 (Operation S223).

In this manner, the same cell-specific codebook that is stored in the codebook storage section 107 of the base station 10_3 is stored in the codebook storage section 204 of the terminal 20_3. Once the codebook is determined, the control section 205 of the terminal 20_3 uses this codebook to feed back a codebook index (PMI) as channel information to the base station 10_3. The cell-specific codebook is generated such as to meet the PMI feedback size Nfb condition, as described already.

3.3) Effects

According to the third example of the present invention, the base station height h, cell radius $d_c$, and PMI feedback size Nfb, which directly indicate a cell environment, are notified from the base station to the terminal, whereby effects similar to those of the first example can be obtained.

4. Fourth Example

According to a fourth example of the present invention, the beam angle interval $\Delta\phi$ of a base station is stored beforehand as a fixed value in a database, as in the second example. However, a terminal generates a codebook based on the base station height h, cell radius $d_c$, and beam angle interval $\Delta\phi$, which is a difference from the second example. Hereinafter, configurations and operations according to the fourth example will be described.

4.1) System Architecture

Figure 10:
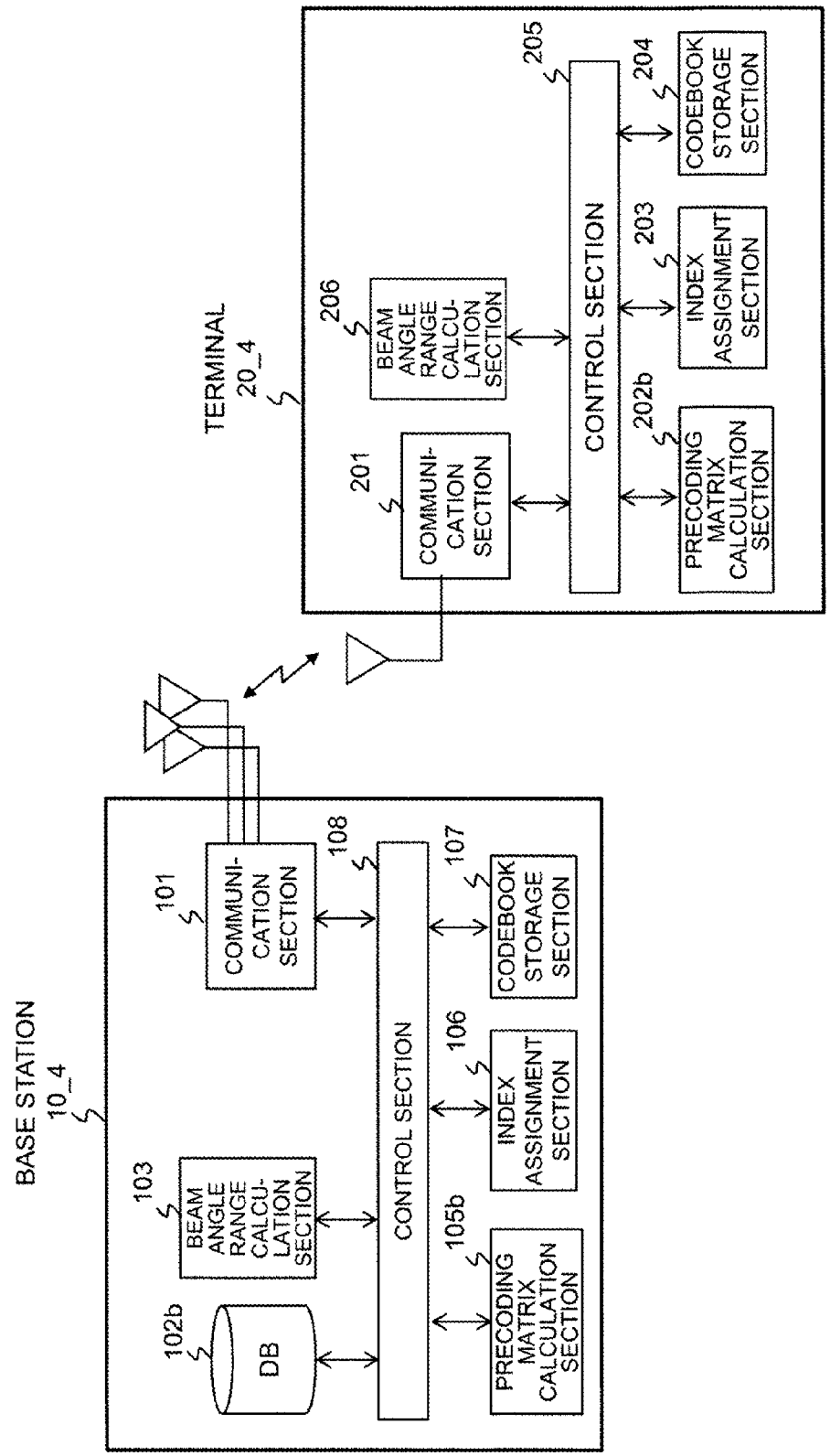
FIG. 10 is a block diagram showing configurations of a base station and a terminal in a wireless communication system according to a fourth example of the present invention.

Referring to FIG. 10, the configuration of a base station 10_4 according to the fourth example of the present invention is the same as that of the base station 10_2 according to the second example, and therefore a description thereof will be omitted, giving the same reference numerals. A terminal 20_4 according to the present example has the configuration of the base station 10_2 according to the second example to which a beam angle range calculation section 206 is added. The rest of the configuration is similar to that of the second example, and therefore only the different configurational parts will be described, giving the same reference numerals to the same blocks and omitting a description thereof.

4.2) Operations

Figure 11:
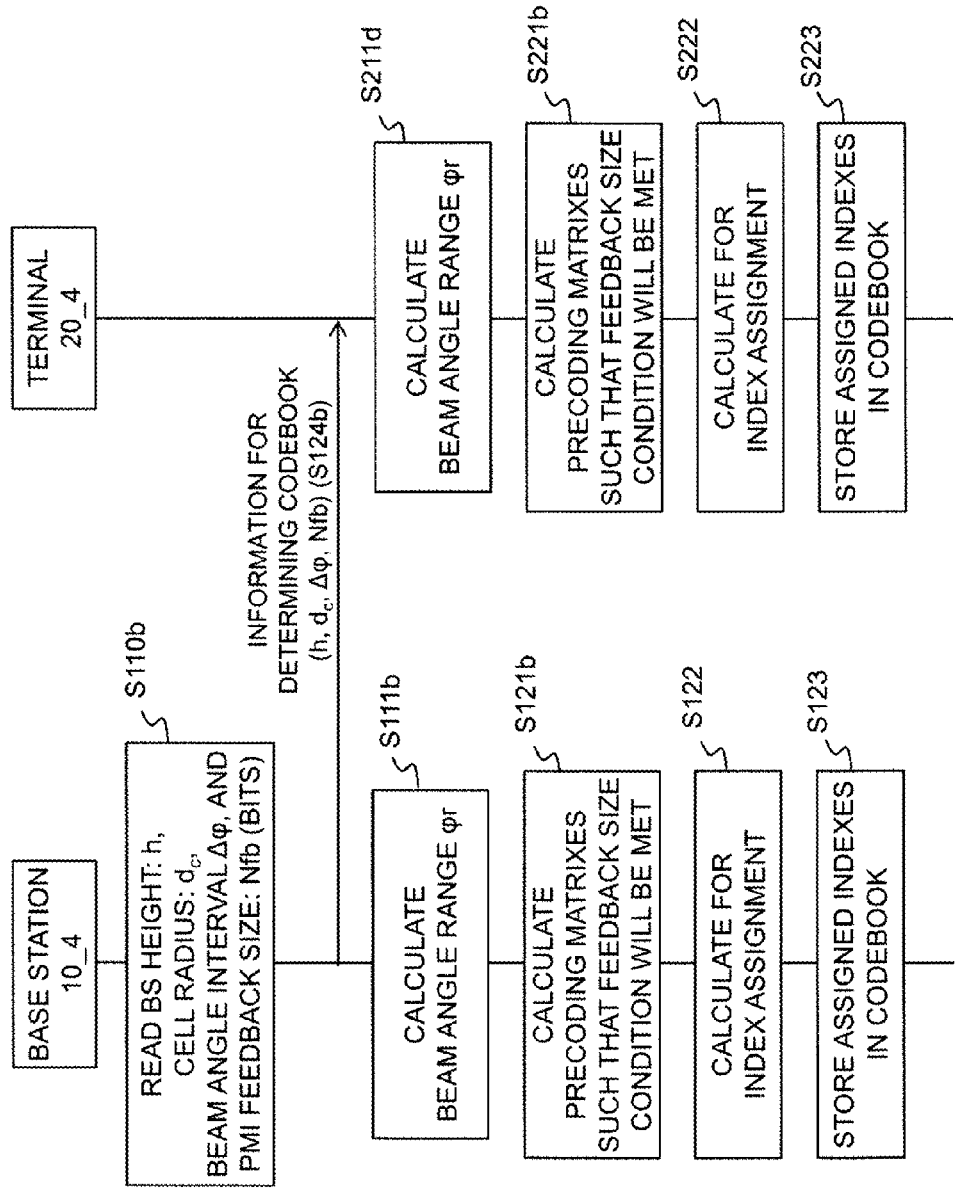
FIG. 11 is a schematic flowchart for describing system operations in the fourth example shown in FIG. 10.

Next, operations of the base station and the terminal in the present example will be described with reference to FIG. 11.

Figure 7:
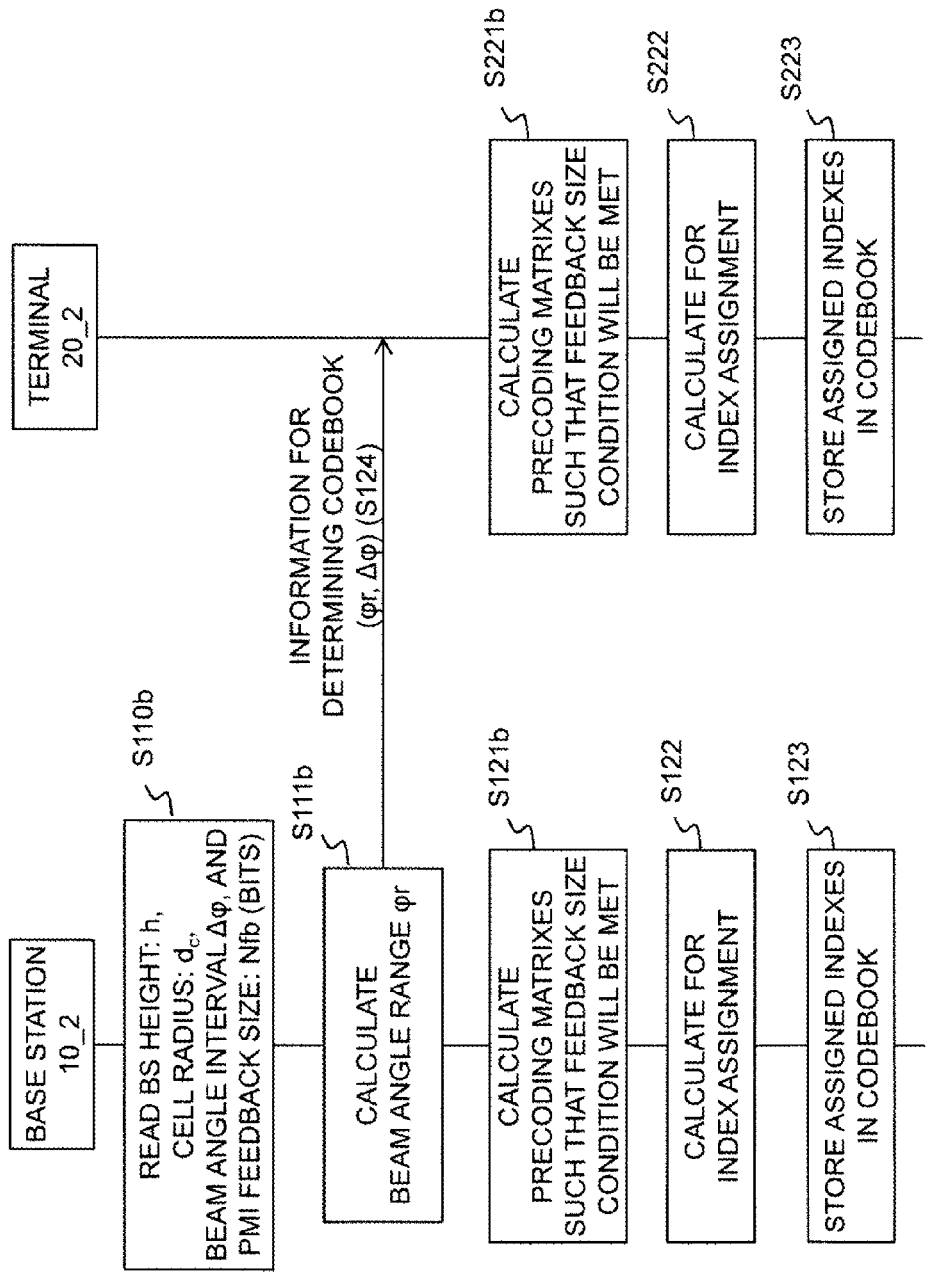
FIG. 7 is a schematic flowchart for describing system operations in the second example shown in FIG. 6.

The control section 108 of the base station 10_4 generates a codebook and stores it in the storage section 107 through Operations S110b, S111b, S121b, S122, and S123, as in the second example shown in FIG. 7. Subsequently, the control section 108 notifies the base station height h, cell radius $d_c$, PMI feedback size Nfb, and beam angle interval $\Delta\phi$ read from the database 102, as information for codebook determination, to the terminal 20_4 (Operation S124b).

When the terminal 20_4 receives the information for codebook determination, the control section 205 of the terminal 20_3 controls the beam angle range calculation section 206 to calculate the beam angle range $\phi r$ (Operation S211d), as in Operation S111b on the base station 10_3 side. Subsequently, the control section 205 controls the precoding matrix calculation section 202 and index assignment section 203 to generate the codebook and stores it in the codebook storage section 204 (Operations S221b, S222, and S223), as in Operations S121b, S122, and S123 on the base station 10_4 side.

In this manner, the same cell-specific codebook that is stored in the codebook storage section 107 of the base station 10_4 is stored in the codebook storage section 204 of the terminal 20_4. Once the codebook is determined, the control section 205 of the terminal 20_4 uses this codebook to feed back a codebook index (PMI) as channel information to the base station 10_4. The cell-specific codebook is generated such as to meet the PMI feedback size Nfb condition, as described already.

Note that it is also possible that a plurality of different beam angle intervals $\Delta\phi$ are prepared in the database 102b, and when the PMI feedback size condition is not met as described above, a beam angle interval is changed to another, that is, the beam angle intervals are tried in turn from a narrower one to a wider one, and when the PMI feedback size condition is still not met, then the above-described deletion of a precoding matrix is performed.

4.3) Effects

According to the fourth example of the present invention, the base station height h, cell radius $d_c$, and PMI feedback size Nfb, which directly indicate a cell environment, are notified from the base station to the terminal, whereby effects similar to those of the second example can be obtained.

5. Fifth Example

5.1) System Structure

Figure 12:
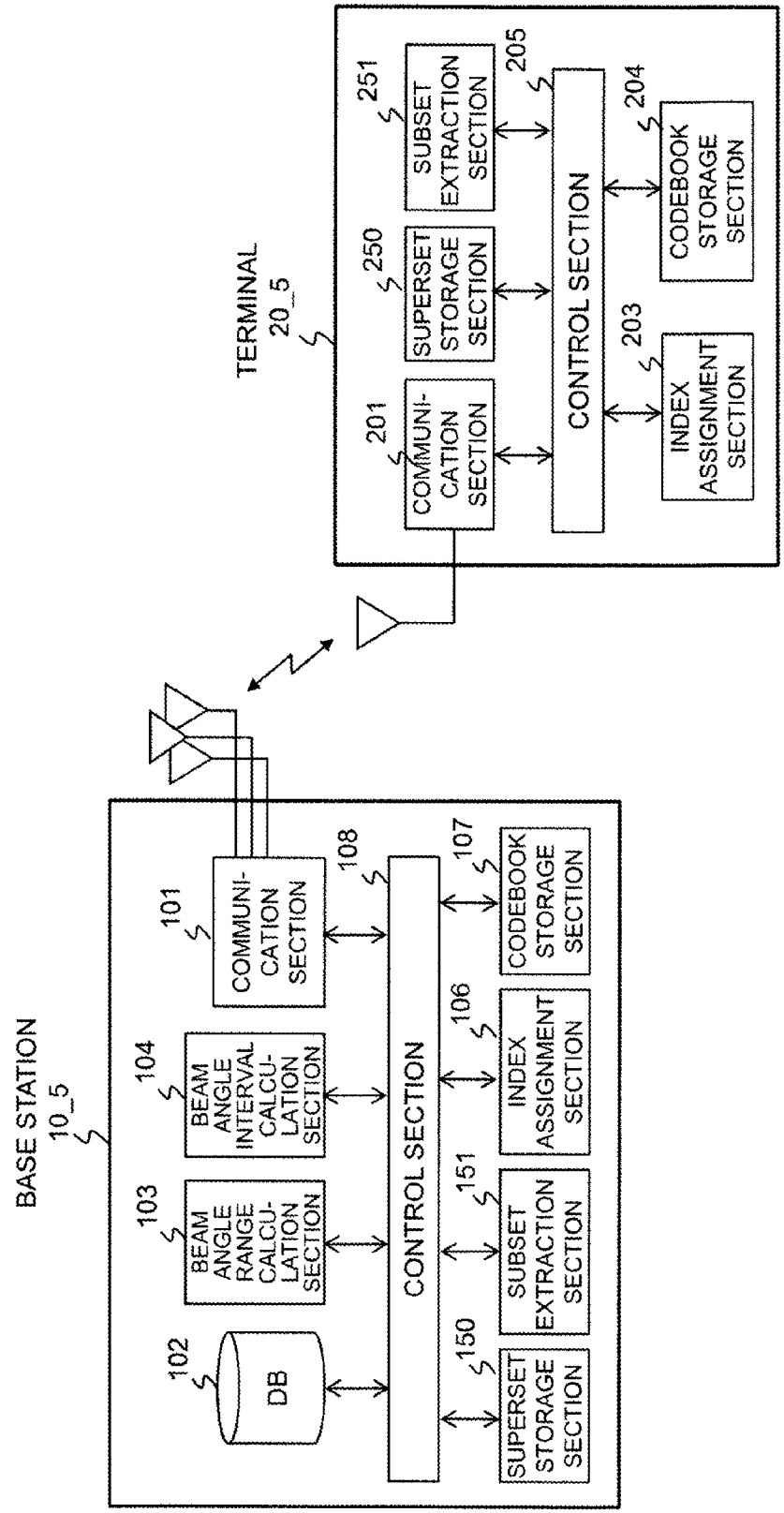
FIG. 12 is a block diagram showing configurations of a base station and a terminal in a wireless communication system according to a fifth example of the present invention.

Referring to FIG. 12, configurations of a base station 10_5 and a terminal 20_5 in a wireless communication system according to a fifth example of the present invention are as follows.

<Base Station>

The base station 10_5 includes a communication section 101 for communicating with the terminal 20_5, a database 102, a beam angle range calculation section 103, a beam angle interval calculation section 104, a superset storage section 150, a subset extraction section 151, an index assignment section 106, a codebook storage section 107, and a control section 108. The beam angle range calculation section 103 and beam angle interval calculation section 104 generate beam angle information, and the superset storage section 150, subset extraction section 151, and index assignment section 106 generate a codebook to be shared, which will be described later. A difference from the first example is that the superset storage section 150 and subset extraction section 151 are provided in place of the precoding matrix calculation section 105.

The database 102 stores cell environment information including a cell radius $d_c$, a base station height h, and a PMI feedback size Nfb [bit], as in the first example. Moreover, the beam angle range calculation section 103 calculates a beam angle range by receiving the cell radius $d_c$ and base station height h as inputs from the database 102, while the beam angle interval calculation section 104 calculates a beam angle interval $\Delta\phi$ by using the beam angle range $\phi r$ from the beam angle range calculation section 103 and the PMI feedback size Nfb from the database 102.

The superset storage section 150 stores a group of candidates for precoding matrixes (a superset) to be used for a codebook, and the subset extraction section 151 extracts a group of precoding matrixes for a codebook from the superset, according to a cell environment. Accordingly, a subset refers to a group of precoding matrixes to be used for a codebook that are selected from the superset.

The index assignment section 106 assigns predetermined indexes to the extracted group of precoding matrixes for a codebook, as in the first example. The control section 108 stores this group of precoding matrixes and the assigned indexes as a codebook in the codebook storage section 107.

The control section 108 performs communication control according to the present example and also controls the above-described functional sections (101 to 104, 150, 151, 106, and 107), thereby sending the beam angle range $\phi r$ calculated by the beam angle range calculation section 103 and the beam angle interval $\Delta\phi$ calculated by the beam angle interval calculation section 104 as information for codebook determination to the terminal 20_5.

<Terminal>

The terminal 20_5 includes a communication section 201 for communicating with the base station 10_5, a superset storage section 250, a subset extraction section 251, an index assignment section 203, a codebook storage section 204, and a control section 205. The superset storage section 250, subset extraction section 251, and index assignment section 203 generate a codebook to be shared, which will be described later.

The superset storage section 250 stores a group of candidates for precoding matrixes (a superset) to be used for a codebook similarly to the base station 10_5, and the subset extraction section 251 extracts a group of precoding matrixes for a codebook from the superset, according to information for codebook determination received from the base station 10_5. The index assignment section 203 assigns predetermined indexes to the extracted group of precoding matrixes for a codebook, as in the first example. The control section 108 stores this group of precoding matrixes and the assigned indexes as a codebook in the codebook storage section 204. The respective superset storage sections (150, 250), subset extraction sections (151, 251), index assignment sections (106, 203), and codebook storage sections (107, 204) of the base station 10_5 and the terminal 20_5 perform basically the same processing.

<Superset>

FIG. 13 shows an example of a superset table stored in the superset storage section 150. A superset is a group of candidates for precoding matrixes to be used for a codebook and consists of precoding matrixes V and their corresponding indexes and beam angles $\phi$, which are sorted in ascending order of beam angle $\phi$. Note that a beam angle $\phi_j$ corresponding to a j-th precoding matrix $V_j = [1 \; \exp(jp_j)]^T$ in the superset is calculated by using the following equation (8):

[Math. 8]

$$\phi_j = \arg\max_{\phi} G_p(\phi, p_j), \; j = 0, 1, \cdots, N_{super} - 1 \qquad (8)$$

Such a superset is calculated beforehand and is shared between the base station and the terminal. In other words, it is stored in the respective superset storage sections 150 and 250 of the base station 10_5 and the terminal 20_5 individually.

5.2) Operations

Figure 14:
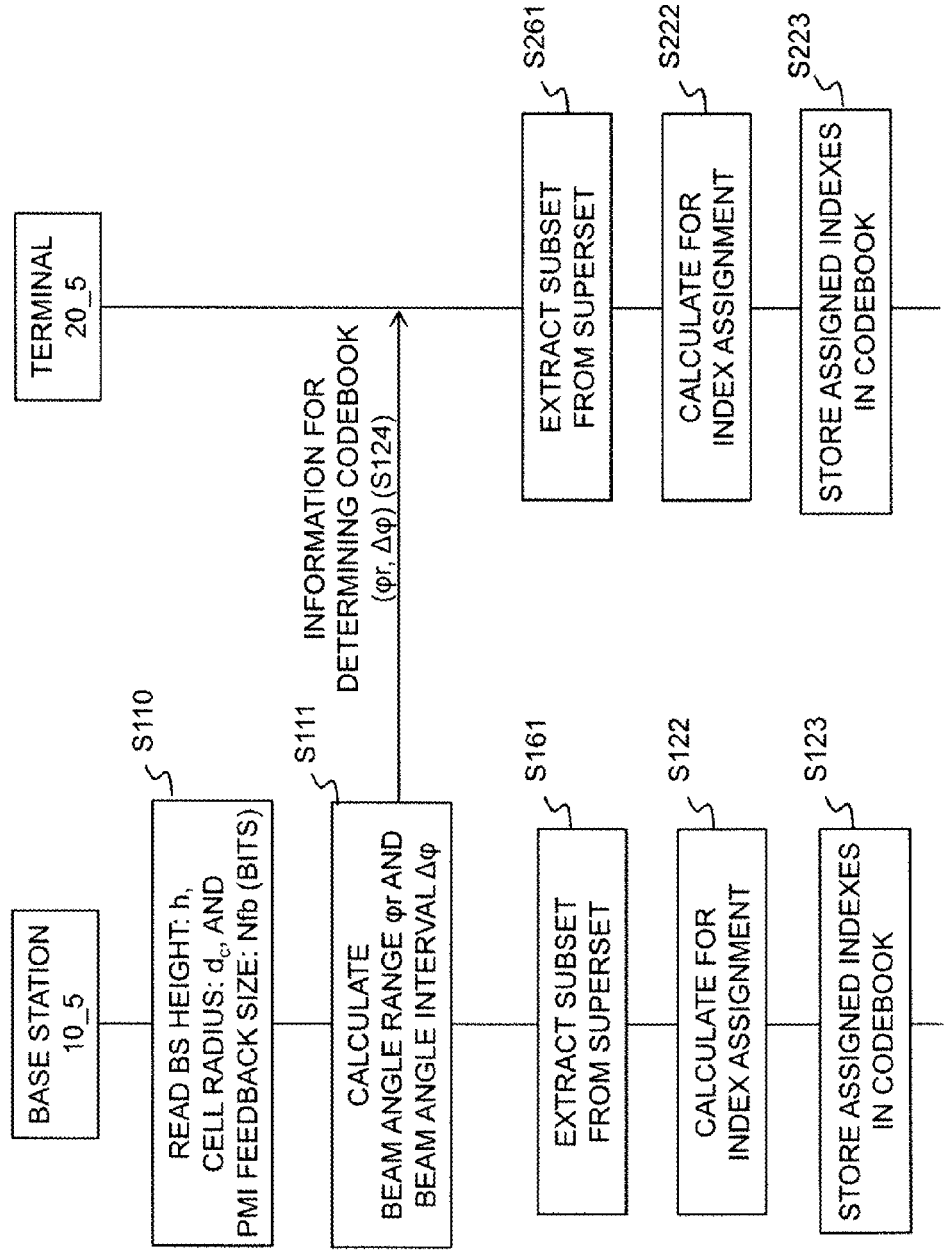
FIG. 14 is a schematic flowchart for describing system operations in the fifth example shown in FIG. 12.

Referring to FIG. 14, first, the control section 108 of the base station 10_5 reads the cell radius $d_c$, base station height h, and PMI feedback size Nfb, which are cell environment information on the base station 10_5, from the database 102 (Operation S110) and controls the beam angle range calculation section 103 and beam angle interval calculation section 104 to calculate the beam angle range $\phi r$ and beam angle interval $\Delta\phi$ (Operation S111), as in the first example.

<Subset Extraction>

Subsequently, the subset extraction section 151 extracts a group of precoding matrixes for a codebook from the superset by using the calculated beam angle range $\phi r$ and beam angle interval $\Delta\phi$ (Operation S161). Specifically, first, a group of beam angles $\{\phi_i | 0 \le i \le 2^{Nfb} - 1\}$ that meet the beam angle range $\phi r$ and beam angle interval $\Delta\phi$ are calculated by using the equations (2) and (3) mentioned already. Next, beam angles $\phi_{cb,i}$ that are the closest to the individual $\phi_i$ are selected for precoding matrixes from the superset by using the following equation (9):

[Math. 9]

$$\phi_{cb,i} = \underset{\phi_{super,j}, \phi_{min} \le \phi_{super,j} \le \phi_{max}}{\arg\min} |\phi_{super,j} - \phi_i| \quad (9)$$

where $\phi_{super,j}$ is a beam angle corresponding to a j-th precoding matrix in the superset, and $\phi_i$ is a beam angle corresponding to an i-th precoding matrix in the codebook.

Precoding matrixes corresponding to the thus obtained individual $\phi_{cb,i}$ are selected by referring to the super table as shown in FIG. 13, whereby the precoding matrixes for a codebook can be determined. Note that it is also possible that if sufficiently many precoding matrixes are prepared in the superset and any ones agreeing with $\phi_i$ are hit, then the hit precoding matrixes are directly extracted as a subset (precoding matrixes for a codebook), without calculating the equation (9).

When the group of precoding matrixes $V_i$ for a codebook are thus determined, then as in the first example thereafter, the index assignment section 106 assigns i, as codebook indexes, to the group of precoding matrixes $V_i$ extracted by the subset extraction section 151 (Operation S122), and a result of this assignment is stored in the codebook storage section 107 (Operation S123).

<Notification of Information for Determining Codebook>

Moreover, the control section 108 notifies information for codebook determination including the calculated beam angle range $\phi r$ and the fixed value of beam angle interval $\Delta\phi$ to the terminal 20_5 in the own cell via the communication section 101 (Operation S124), as in the first example.

<Codebook Determination on Terminal Side>

When receiving the information for codebook determination from the base station 10_5 via the communication section 201, the control section 205 of the terminal 20_5 controls the superset storage section 250, subset extraction section 251, and index assignment section 203 to store a subset for the codebook in the codebook storage section 204 (Operations S261, S222, and S223), as in Operations S161, S122, and S123 on the base station 10_5 side.

In this manner, the same cell-specific codebook that is stored in the codebook storage section 107 of the base station 10_5 is stored in the codebook storage section 204 of the terminal 20_5. Once the codebook is determined, the control section 205 of the terminal 20_5 uses this codebook to feed back a codebook index (PMI) as channel information to the base station 10_5. The cell-specific codebook is generated such as to meet the PMI feedback size Nfb condition, as described already.

5.3) Effects

The fifth example of the present invention, in addition to the effects of the first example, has the advantage that a codebook can be generated only through the operations for extracting precoding matrixes for a codebook from the superset storage section 150, and therefore the calculation of precoding matrixes is unrequired, reducing the processing loads on the base station and the terminal.

6. Sixth Example

According to a sixth example of the present invention, the beam angle interval $\Delta\phi$ of a base station is stored beforehand as a fixed value in a database, whereby the beam angle interval calculation section can be omitted. Hereinafter, configurations and operations according to the sixth example will be described.

6.1) System Structure

Figure 15:
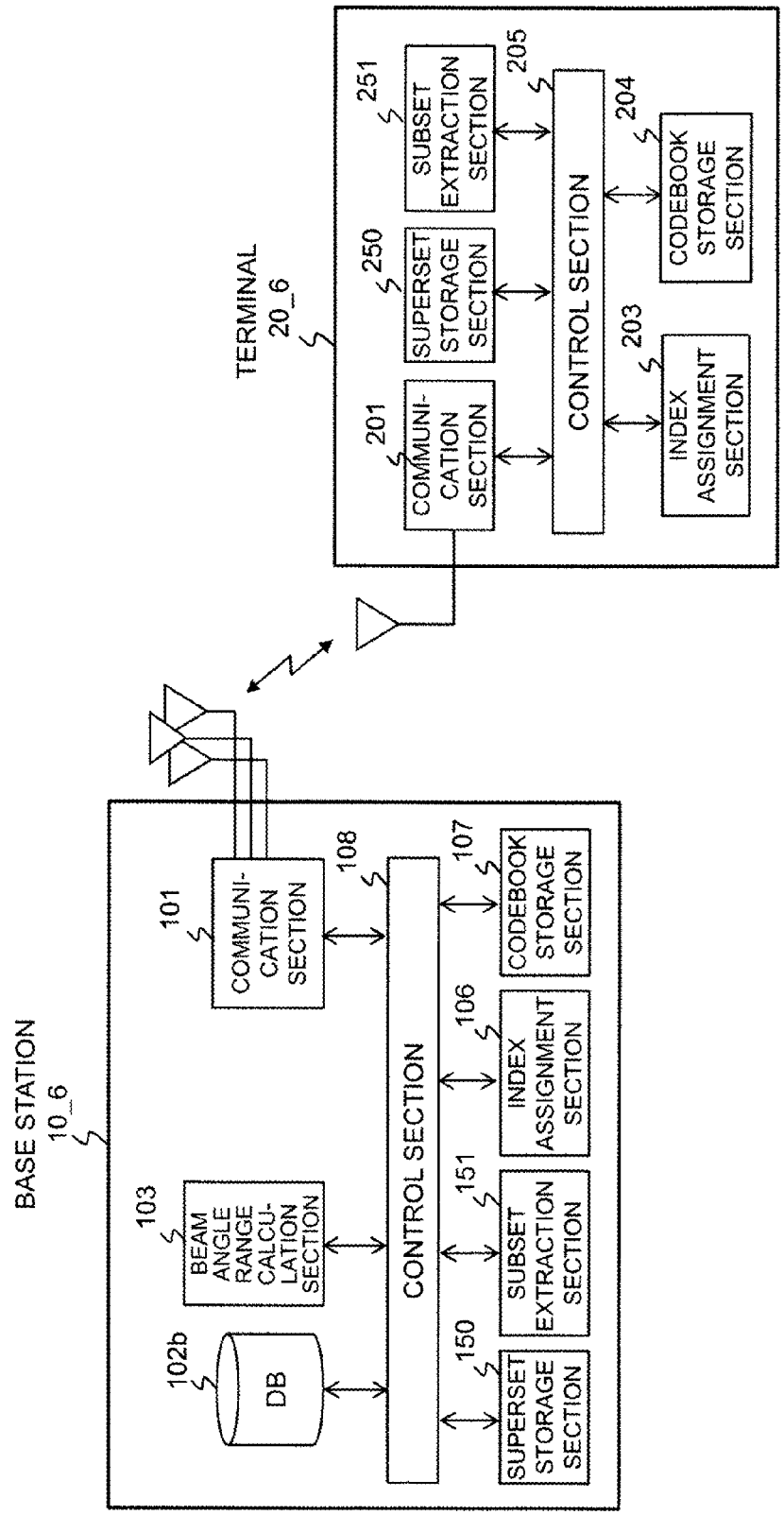
FIG. 15 is a block diagram showing configurations of a base station and a terminal in a wireless communication system according to a sixth example of the present invention.

Referring to FIG. 15, the configuration of a terminal 20_6 in a wireless communication system according to the sixth example of the present invention is the same as that of the terminal 20_5 according to the fifth example, and therefore a description thereof will be omitted, giving the same reference numerals. The configuration of a base station 10_6 according to the present example is partially different from that of the base station 10_5 according to the fifth example, and therefore only the different structural parts will be described, giving the same reference numerals to the same blocks and omitting a description thereof.

A database 102b of the base station 10_6 stores a fixed value of beam angle interval $\Delta\phi$, which indicates a cell environment of the base station 10_2, in addition to a cell radius $d_c$, a base station height h, and a PMI feedback size Nfb [bit]. Accordingly, the base station 10_6 is in no need of the beam angle interval calculation section 104 of the fifth example. The rest of the configuration is basically similar to that of the base station 10_5 according to the fifth example shown in FIG. 12, but the operation of the subset extraction section 151 is partially different from the fifth example.

6.2) Operations

Next, operations of the base station and the terminal in the present example will be described with reference to FIG. 16.

The control section 108 of the base station 10_6 generates a codebook through an under-mentioned procedure and stores it in the codebook storage section 107 when the base station is installed. Thereafter, a codebook may be regenerated at constant intervals or when a change has occurred in the cell environment or system requirements.

<Calculation of Beam Angle Range $\phi r$>

First, the control section 108 reads the cell radius $d_c$, base station height h, PMI feedback size Nfb, and fixed value of beam angle interval $\Delta\phi$, which are cell environment information on the base station 10_6, from the database 102b (Operation S110b) and controls the beam angle range calculation section 103 to calculate the beam angle range $\phi r$ (Operation S111b). Its specific calculation procedure is as described in the first example.

<Subset Extraction>

Subsequently, the subset extraction section 151 extracts a group of precoding matrixes for a codebook by using the calculated beam angle range $\phi r$ and the read fixed value of beam angle interval $\Delta\phi$ (Operation S161). Specifically, a group of beam angles $\{\phi_i | 0 \le i \le 2^{Nfb}-1\}$ that meet the beam angle range $\phi r$ and beam angle interval $\Delta\phi$ are calculated by using the equations (2) and (3), and beam angles $\phi_{cb,i}$ that are the closest to the individual $\phi_i$ are selected for precoding matrixes from the superset by using the equation (9), as described in the fifth example.

Precoding matrixes corresponding to the thus obtained individual $\phi_{cb,i}$ are selected by referring to a super table as shown in FIG. 13, whereby the precoding matrixes for a codebook can be determined. Note that it is also possible that if sufficiently many precoding matrixes are prepared in the superset and any ones agreeing with $\phi_i$ are hit, then the hit precoding matrixes are directly extracted as a subset (precoding matrixes for a codebook), without calculating the equation (9).

When the group of precoding matrixes $V_i$ for a codebook are thus determined, then as in the fifth example thereafter, the index assignment section 106 assigns i, as codebook indexes, to the group of precoding matrixes $V_i$ extracted by the subset extraction section 151 (Operation S122), and a result of this assignment is stored in the codebook storage section 107 (Operation S123).

<Notification of Information for Determining Codebook>

The control section 108 notifies information for codebook determination including the calculated beam angle range φr and the fixed value of beam angle interval Δφ to the terminal 20_6 in the own cell via the communication section 101 (Operation S124). For a notification method, notification may be performed by using a broadcast channel (PBCH: Physical Broadcast CHannel) for notifying all terminals in the cell, or may be made individually to a terminal that is requesting a connection to the own cell.

<Codebook Determination on Terminal Side>

When receiving the information for codebook determination from the base station 10_6 via the communication section 201, the control section 205 of the terminal 20_6 controls the superset storage section 250, subset extraction section 251, and index assignment section 203 to store a subset for the codebook in the codebook storage section 204 (Operations S261, S222, and S223), as in Operations S161, S122, and S123 on the base station 10_6 side.

In this manner, the same cell-specific codebook that is stored in the codebook storage section 107 of the base station 10_6 is stored in the codebook storage section 204 of the terminal 20_6. Once the codebook is determined, the control section 205 of the terminal 20_6 uses this codebook to feed back a codebook index (PMI) as channel information to the base station 10_6. The cell-specific codebook is generated such as to meet the PMI feedback size Nfb condition, as described already.

6.3) Effects

The sixth example of the present invention, in addition to the effects of the fifth example, has the advantage that the beam angle interval processing section can be omitted by setting the beam angle interval Δφ at a fixed value, and therefore the apparatus configuration of the base station can be simplified.

7. Seventh Example

A seventh example of the present invention is different from the fifth example in that the terminal side generates a codebook based on a base station height h and a cell radius $d_c$ notified. Hereinafter, configurations and operations according to the seventh example will be described.

7.1) System Structure

Figure 17:
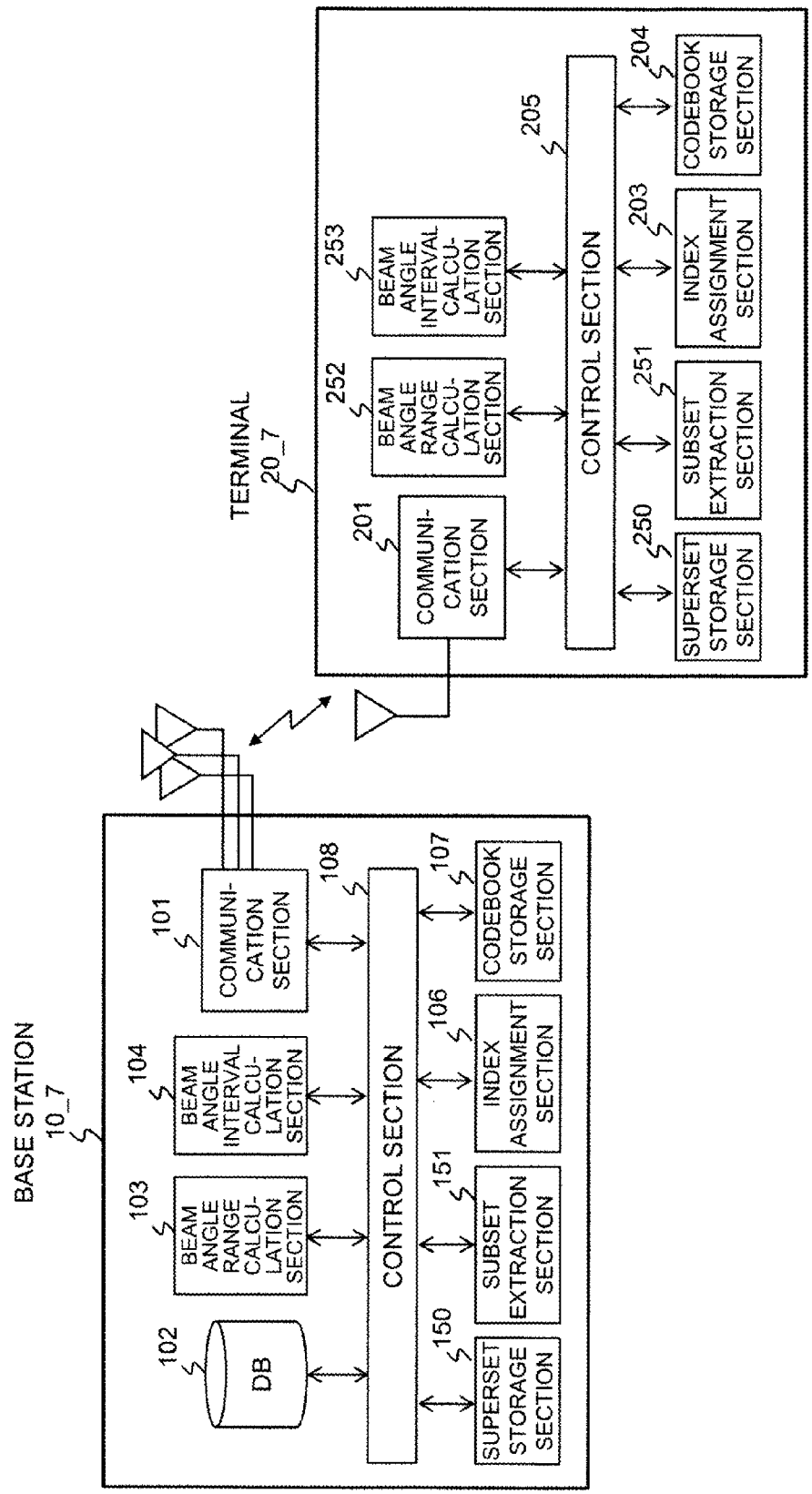
FIG. 17 is a block diagram showing configurations of a base station and a terminal in a wireless communication system according to a seventh example of the present invention.

Referring to FIG. 17, the configuration of a base station 10_7 according to the seventh example of the present invention is the same as that of the base station 10_5 according to the fifth example, and therefore a description thereof will be omitted, giving the same reference numerals. However, the base station 10_7 notifies a terminal 20_7 of information for codebook determination including a base station height h, a cell radius $d_c$, and a PMI feedback size Nfb, which is a difference. Accordingly, the terminal 20_7 according to the present example has the configuration of the terminal 20_5 according to the fifth example to which a beam angle range calculation section 252 and a beam angle interval calculation section 253 are added. The rest of the configuration is similar to that of the fifth example, and therefore a description will mainly be given to operations that are different from the fifth example, giving the same reference numerals to the same blocks as those of the fifth example.

7.2) Operations

Figure 18:
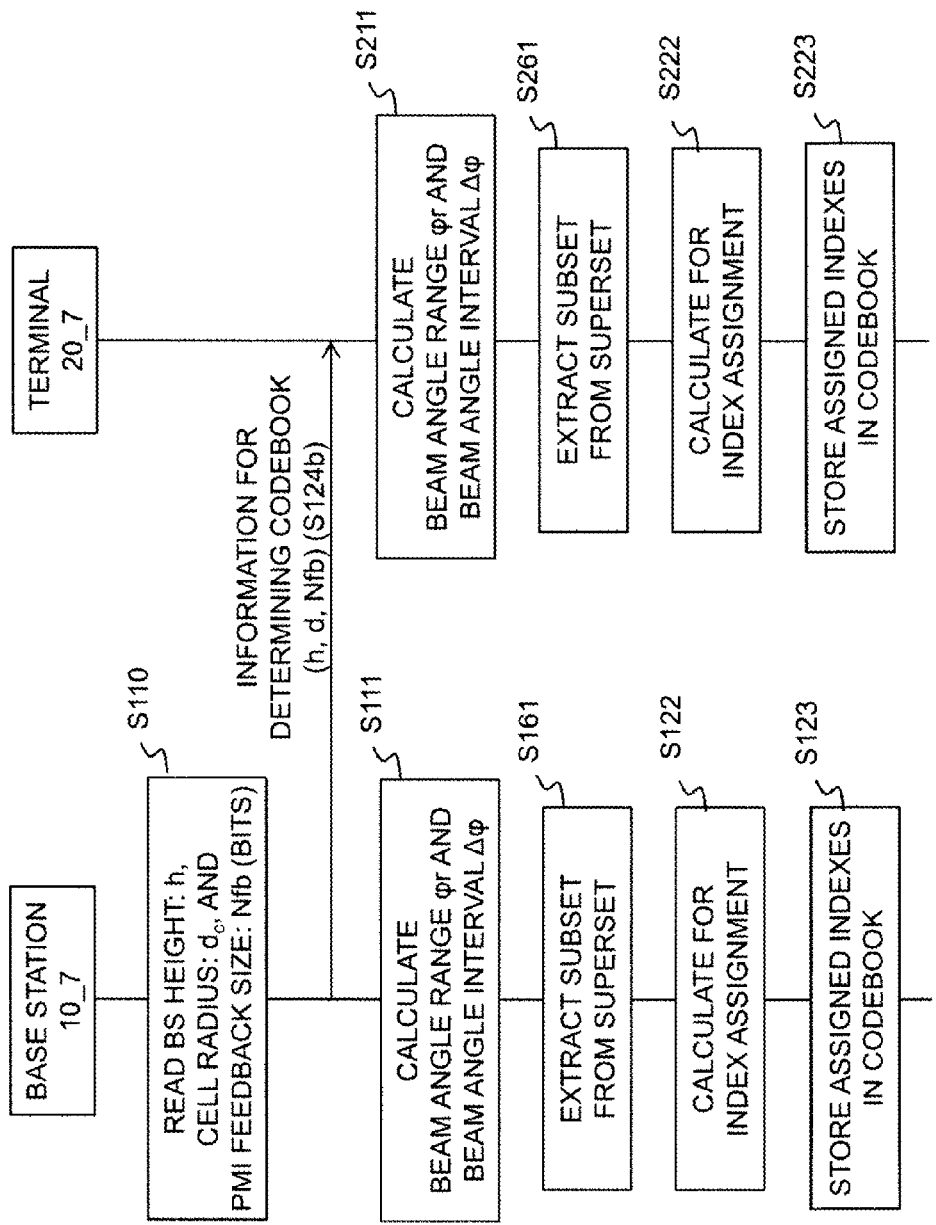
FIG. 18 is a schematic flowchart for describing system operations in the seventh example shown in FIG. 17.

Referring to FIG. 18, Operations S110, S111, S161, S122, and S123 of the base station 10_7 are the same as those of the fifth example. However, the control section 108 notifies the base station height h, cell radius $d_c$, and PMI feedback size Nfb read from the database 102, as information for codebook determination, to the terminal 20_7 (Operation S124b).

When the terminal 20_7 receives the information for codebook determination (base station height h, cell radius $d_c$, and PMI feedback size Nfb), the control section 205 of the terminal 20_7 controls the beam angle range calculation section 252 and beam angle interval calculation section 253 to calculate the beam angle range φr and beam angle interval Δφ (Operation S211), as in Operation S111 on the base station 10_7 side. Subsequently, the control section 205 controls the superset storage section 250, subset extraction section 251, and index assignment section 203 to generate the codebook as in Operations S161, S122, and S123 on the base station 10_7 side. Specifically, the subset extraction section 251 extracts a group of precoding matrixes for the codebook from a superset by using the calculated beam angle range φr and the read fixed value of beam angle interval Δφ (Operation S261). More specifically, a group of beam angles $\{\phi_i | 0 \leq i \leq 2^{Nfb}-1\}$ that meet the beam angle range φr and beam angle interval Δφ are calculated by using the equations (2) and (3), and beam angles $\phi_{cb,i}$ that are the closest to the individual $\phi_i$ are selected for precoding matrixes from the superset by using the equation (9), as described in the fifth example.

Precoding matrixes corresponding to the thus obtained individual $\phi_{cb,i}$ are selected by referring to a super table as shown in FIG. 13, whereby the precoding matrixes for the codebook can be determined. Note that it is also possible that if sufficiently many precoding matrixes are prepared in the superset and any ones agreeing with $\phi_i$ are hit, then the hit precoding matrixes are directly extracted as a subset (precoding matrixes for the codebook), without calculating the equation (9).

When the group of precoding matrixes $V_i$ for the codebook are determined, then as in the fifth example thereafter, the index assignment section 203 assigns i, as codebook indexes, to the group of precoding matrixes $V_i$ extracted by the subset extraction section 251 (Operation S222), and a result of this assignment is stored in the codebook storage section 204 (Operation S223).

In this manner, the same cell-specific codebook that is stored in the codebook storage section 107 of the base station 10_7 is stored in the codebook storage section 204 of the terminal 20_7. Once the codebook is determined, the control section 205 of the terminal 20_7 uses this codebook to feed back a codebook index (PMI) as channel information to the base station 10_7. The cell-specific codebook is generated such as to meet the PMI feedback size Nfb condition, as described already.

7.3) Effects

According to the seventh example of the present invention, the base station height h, cell radius $d_c$, and PMI feedback size Nfb, which directly indicate a cell environment, are notified from the base station to the terminal, whereby effects similar to those of the fifth example can be obtained.

8. Eighth Example

According to an eighth example of the present invention, the beam angle interval Δφ of a base station is stored beforehand as a fixed value in a database, as in the sixth example. However, a terminal generates a codebook based on the base station height h, cell radius $d_c$, and beam angle interval Δφ, which is a difference from the sixth example.

Hereinafter, configurations and operations according to the eighth example will be described.

8.1) System Structure

Figure 19:
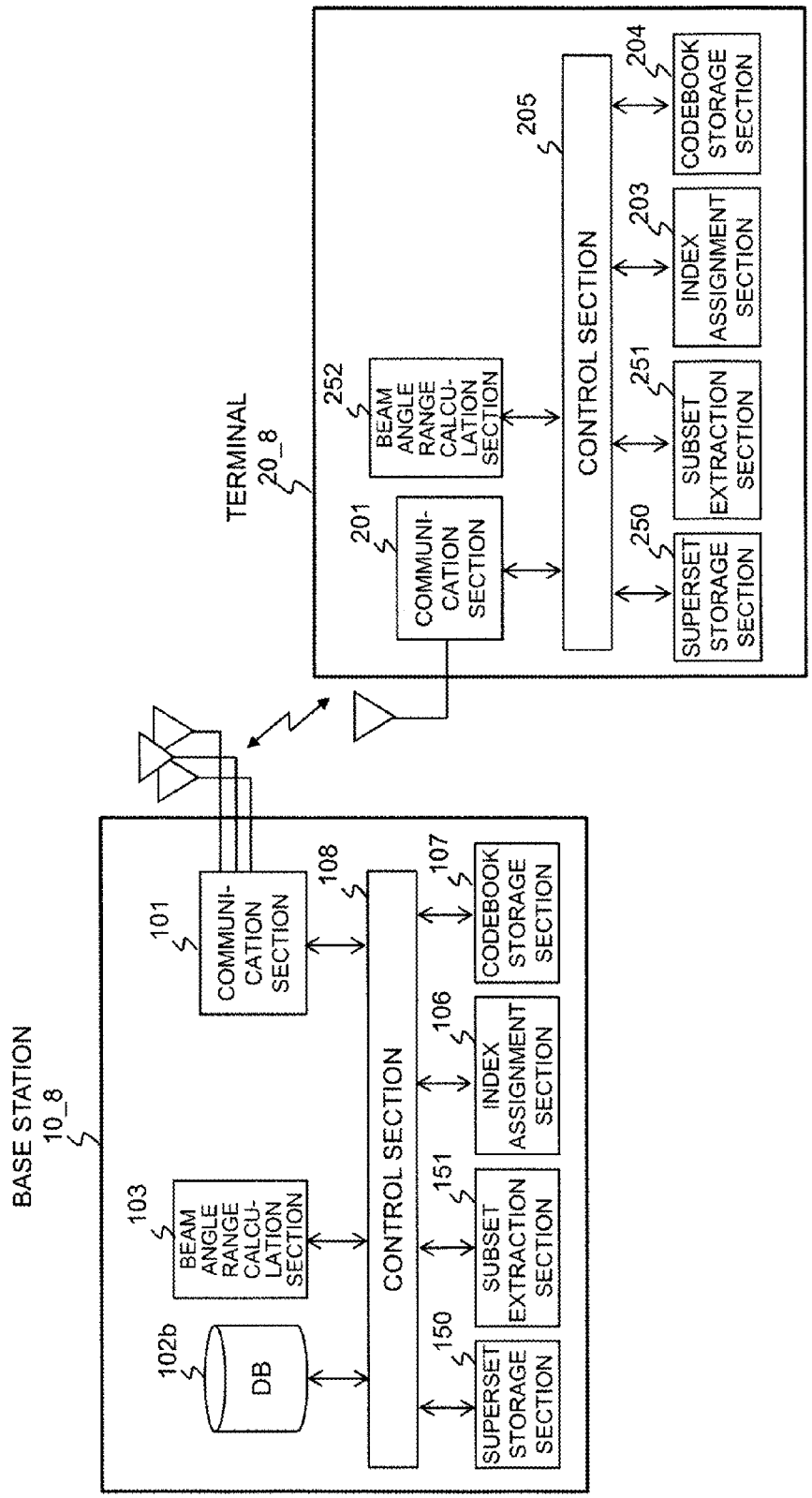
FIG. 19 is a block diagram showing configurations of a base station and a terminal in a wireless communication system according to an eighth example of the present invention.

Referring to FIG. 19, the configuration of a base station 10_8 according to the eighth example of the present invention is the same as that of the base station 10_6 according to the sixth example, and therefore a description thereof will be omitted, giving the same reference numerals. A terminal 20_7 according to the present example has the configuration of the base station 10_6 according to the sixth example to which a beam angle range calculation section 252 is added. The rest of the configuration is similar to that of the sixth example, and therefore only the different structural parts will be described, giving the same reference numerals to the same blocks and omitting a description thereof.

8.2) Operations

Figure 20:
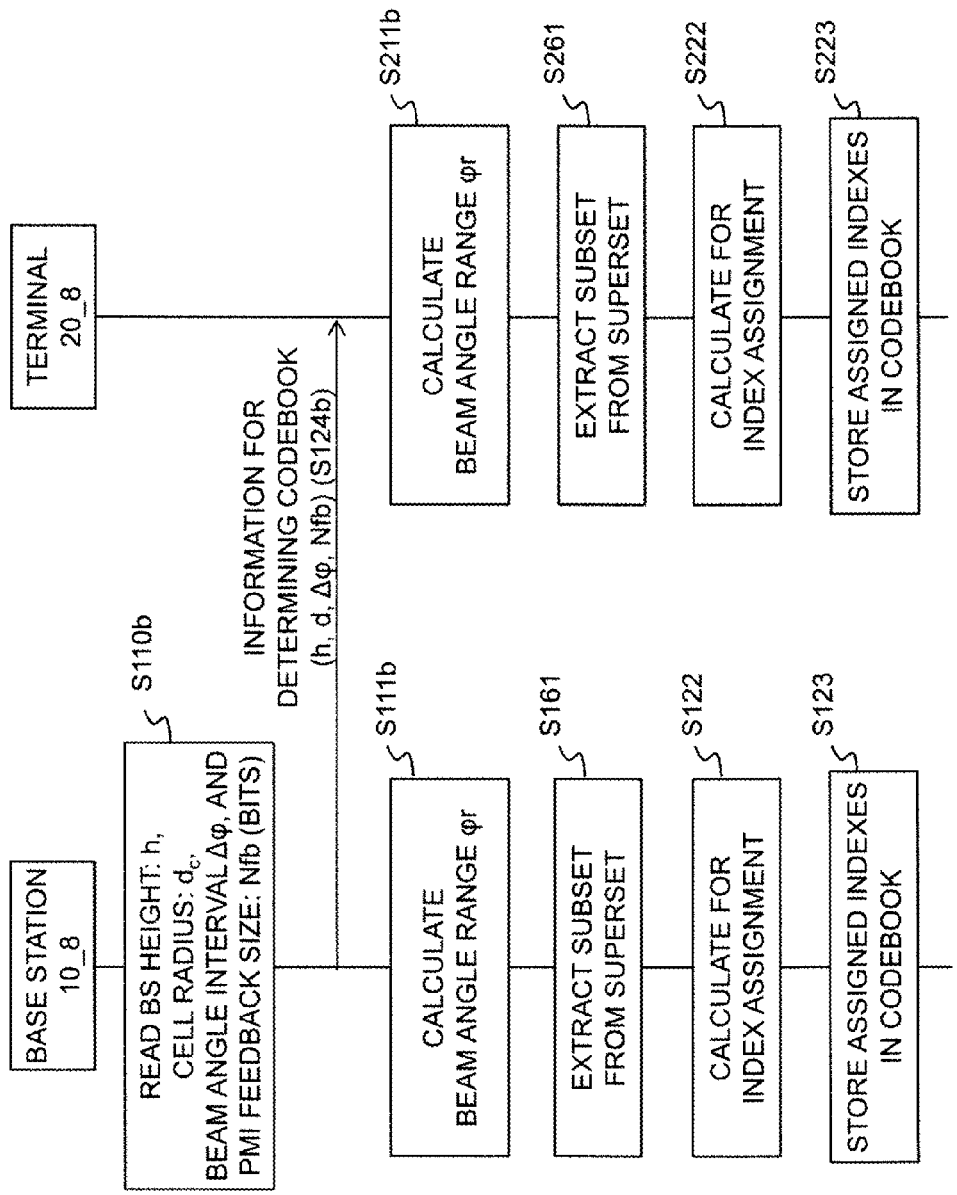
FIG. 20 is a schematic flowchart for describing system operations in the eighth example shown in FIG. 19.

Next, operations of the base station and the terminal in the present example will be described with reference to FIG. 20.

Figure 16:
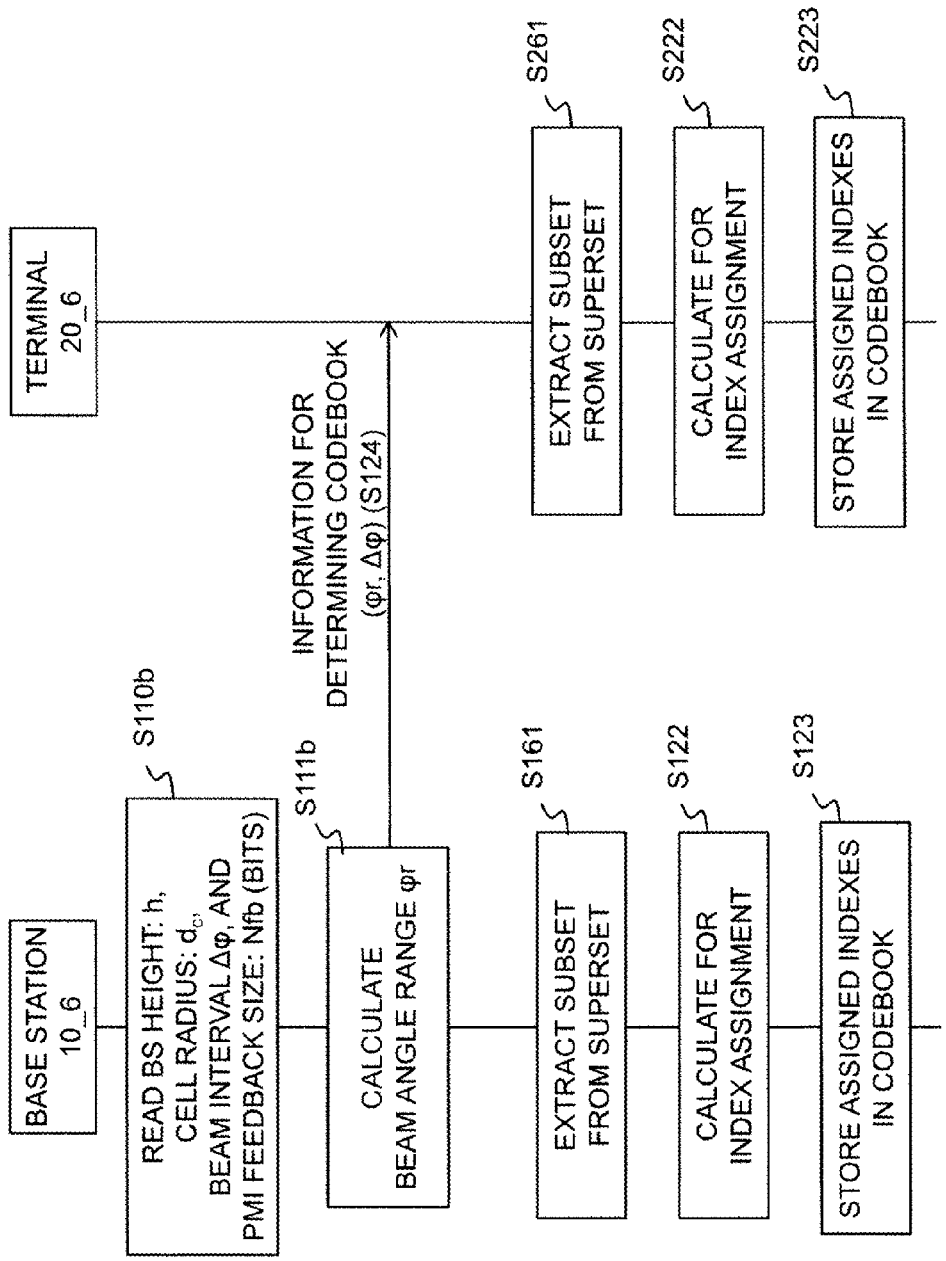
FIG. 16 is a schematic flowchart for describing system operations in the sixth example shown in FIG. 15.

The control section 108 of the base station 10_8 generates a codebook and stores it in the storage section 107 through Operations S110b, S111b, S161, S122, and S123, as in the sixth example shown in FIG. 16. Subsequently, the control section 108 notifies the base station height h, cell radius $d_c$, PMI feedback size Nfb, and beam angle interval Δφ read from the database 102b, as information for codebook determination, to the terminal 20_8 (Operation S124b).

When the terminal 20_8 receives the information for codebook determination, the control section 205 of the terminal 20_8 controls the beam angle range calculation section 252 to calculate the beam angle range φr (Operation S211b), as in Operation S111b on the base station 10_8 side. Subsequently, the control section 205 controls the superset storage section 250, subset extraction section 251, and index assignment section 203 to generate the codebook and stores it in the codebook storage section 204 (Operations S261, S222, and S223), as in Operations S161, S122, and S123 on the base station 10_8 side.

In this manner, the same cell-specific codebook that is stored in the codebook storage section 107 of the base station 10_8 is stored in the codebook storage section 204 of the terminal 20_8. Once the codebook is determined, the control section 205 of the terminal 20_8 uses this codebook to feed back a codebook index (PMI) as channel information to the base station 10_8. The cell-specific codebook is generated such as to meet the PMI feedback size Nfb condition, as described already.

8.3) Effects

According to the eighth example of the present invention, the base station height h, cell radius $d_c$, and PMI feedback size Nfb, which directly indicate a cell environment, are notified from the base station to the terminal, whereby effects similar to those of the fifth example can be obtained.

9. Ninth Example

According to a ninth example of the present invention, indexes to precoding matrixes for a codebook are selected from a superset in accordance with a cell environment, and a codebook is generated from the group of precoding matrixes corresponding to the selected indexes. Hereinafter, configurations and operations according to the ninth example will be described.

9.1) System Structure

Figure 21:
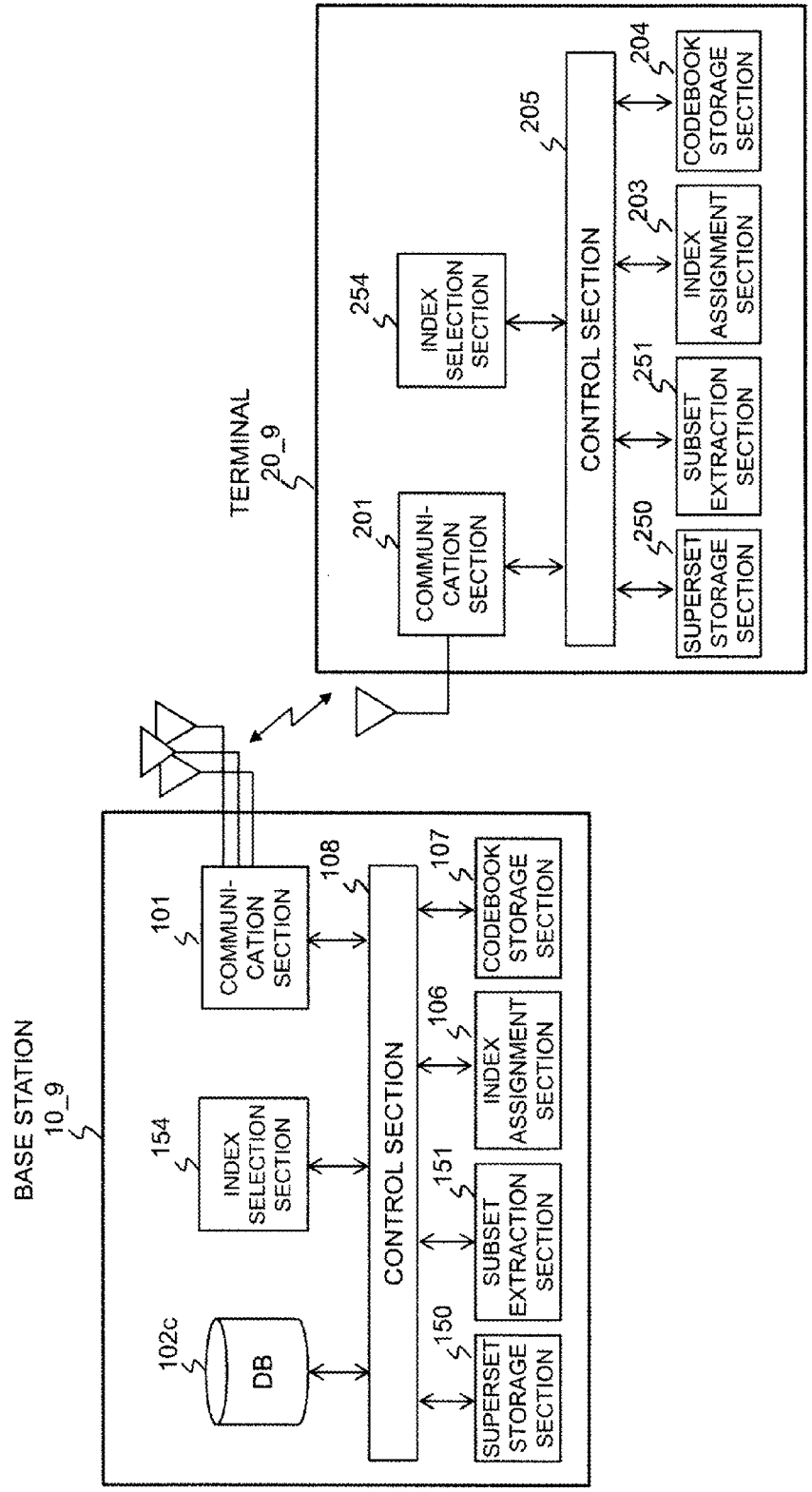
FIG. 21 is a block diagram showing configurations of a base station and a terminal in a wireless communication system according to a ninth example of the present invention.

Referring to FIG. 21, a base station 10_9 according to the ninth example of the present invention have the respective configurations according to the seventh example in which the beam angle range calculation section 103 and beam angle interval calculation section 104 on the base station side are replaced with an index selection section 154, and the beam angle range calculation section 252 and beam angle interval calculation section 253 on the terminal side are replaced with an index selection section 254.

Moreover, a database 102c of the base station 10_9 stores information on 3 dB beamwidths of vertical-plane radiating patterns of transmission beams generated by the base station 10_9, in addition to the information stored in the database 102 according to the seventh example. Specifically, the database 102c stores a base station height h, a cell radius $d_c$, a PMI feedback size Nfb, and 3 dB beamwidths. The rest of the configuration is similar to that of the seventh example, and therefore a description thereof will be omitted, giving the same reference numerals to the same blocks.

9.2) Index Selection

The index selection sections 154 and 254 calculate, as a restricted index, an index corresponding to a precoding matrix that is not used in a codebook among the precoding matrixes in a superset, and determines the number of the other indexes in the superset as unrestricted indexes. Since the index selection sections 154 and 254 have the same functional configurations, the selection of an index will be described below, with reference to FIGS. 22 to 26.

Figure 22:
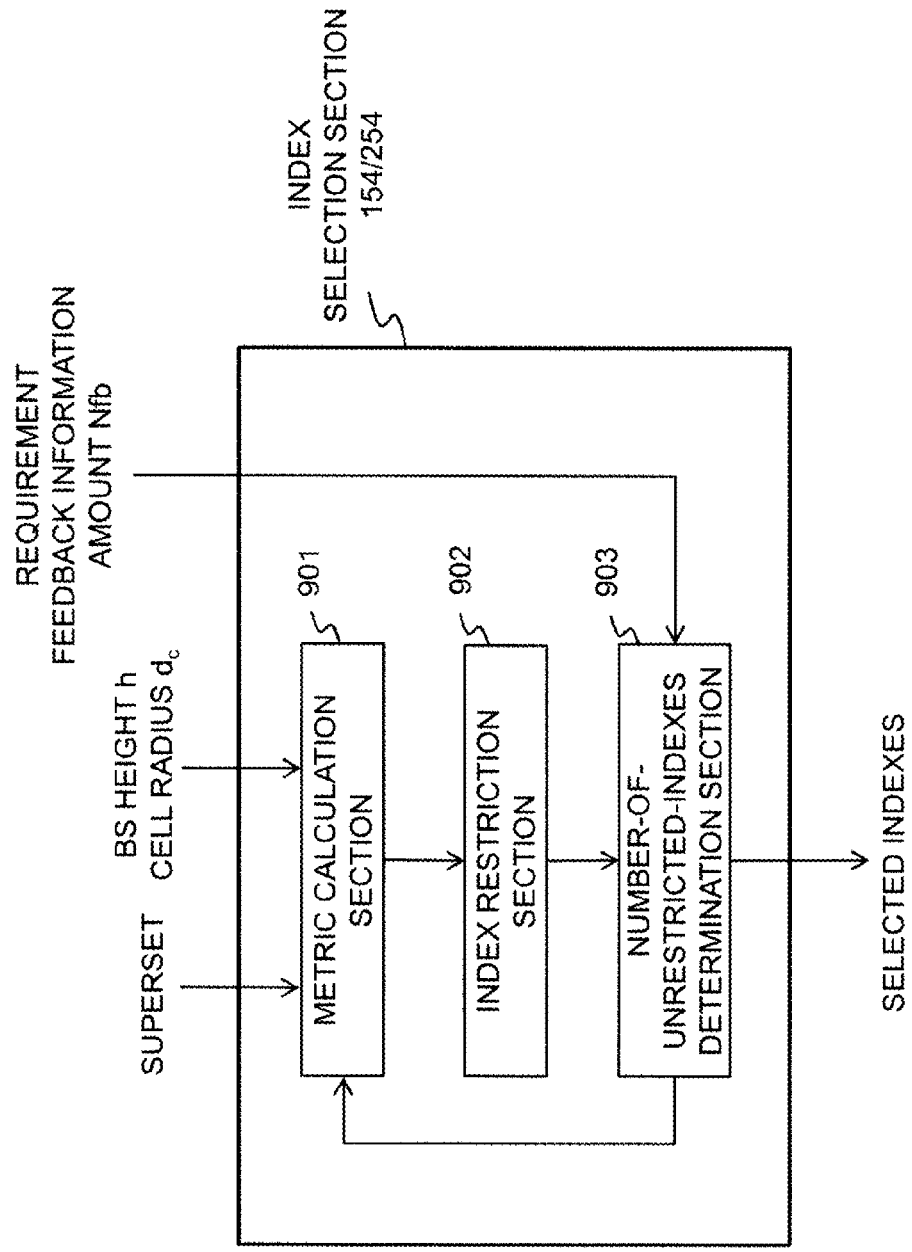
FIG. 22 is a block diagram showing a functional configuration of index selection sections of the base station and the terminal in FIG. 21.

Referring to FIG. 22, the index selection sections 154 and 254 have the same functional configurations, each including a metric calculation section 901, an index restriction section 902, and a number-of-unrestricted-indexes determination section 903.

The index selection operation is performed by repeating single-index restriction processing, in which one precoding matrix is determined based on metric calculation for each precoding matrix in the superset and is added to restricted indexes, until the number of unrestricted precoding matrixes (i.e., the number of precoding matrixes to be used for a codebook) matches with a required PMI feedback size Nfb condition. Hereinafter, the operation of the index selection section will be described with reference to FIG. 23.

Figure 23:
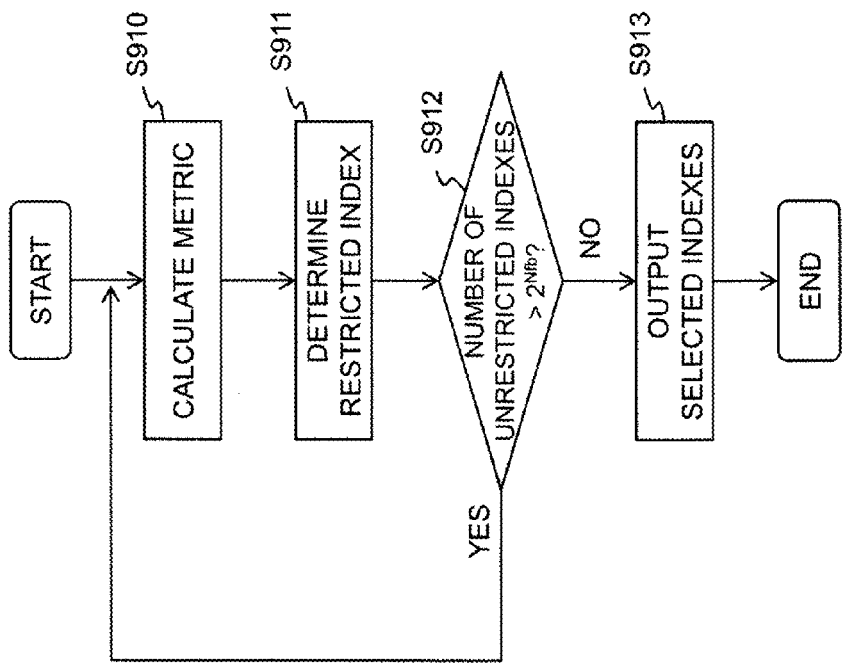
FIG. 23 is a flowchart showing operations of the index selection section shown in FIG. 22.

Referring to FIG. 23, the metric calculation section 901 receives as inputs the base station height h and cell radius $d_c$ from the database 102c, the superset from the superset storage section 150, and unrestricted indexes from the number-of-unrestricted-indexes determination section 903, and then calculates a metric for each of precoding matrixes corresponding to the unrestricted indexes in the superset (Operation S910). Note that as will be described later, in case where unrestricted indexes are input from the number-of-unrestricted-indexes determination section 903, the metric calculation section 901 calculates metrics again for precoding matrixes corresponding to the input unrestricted indexes. The metric calculation will be described later.

Subsequently, the index restriction section 902 determines one restricted index based on values of the metric input from the metric calculation section 901 and outputs it to the number-of-unrestricted-indexes determination section 903 (Operation S911).

The number-of-unrestricted-indexes determination section 903 determines whether or not the number of unrestricted indexes other than the restricted index from the index restriction section 902 meets the required PMI feedback size Nfb condition (not larger than $2^{Nfb}$) (Operation S912). If the number of unrestricted indexes is not larger than $2^{Nfb}$ (Operation S912; NO), the unrestricted PMIs are output as selected indexes to the subset extraction section 151 (Operation S913). Otherwise, the unrestricted indexes are output to the metric calculation section 901 (Operation S912; YES).

<Metric Calculation>

The metric calculation section 901 calculates metrics based on beam angles corresponding to the indexes in the superset acquired from the superset storage section 150. Hereinafter, a metric calculation procedure will be described.

Figure 24:
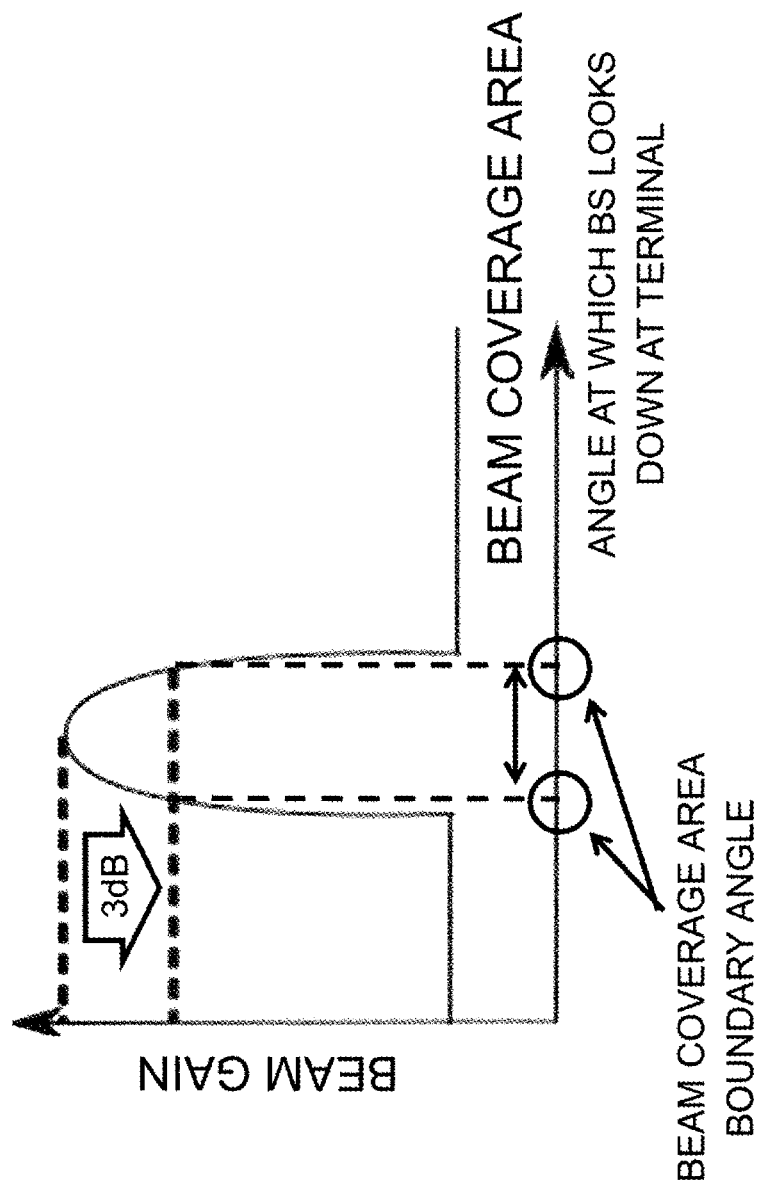
FIG. 24 is a diagram showing a relation between a beam pattern and a beam coverage area in the ninth example.
Figure 25:
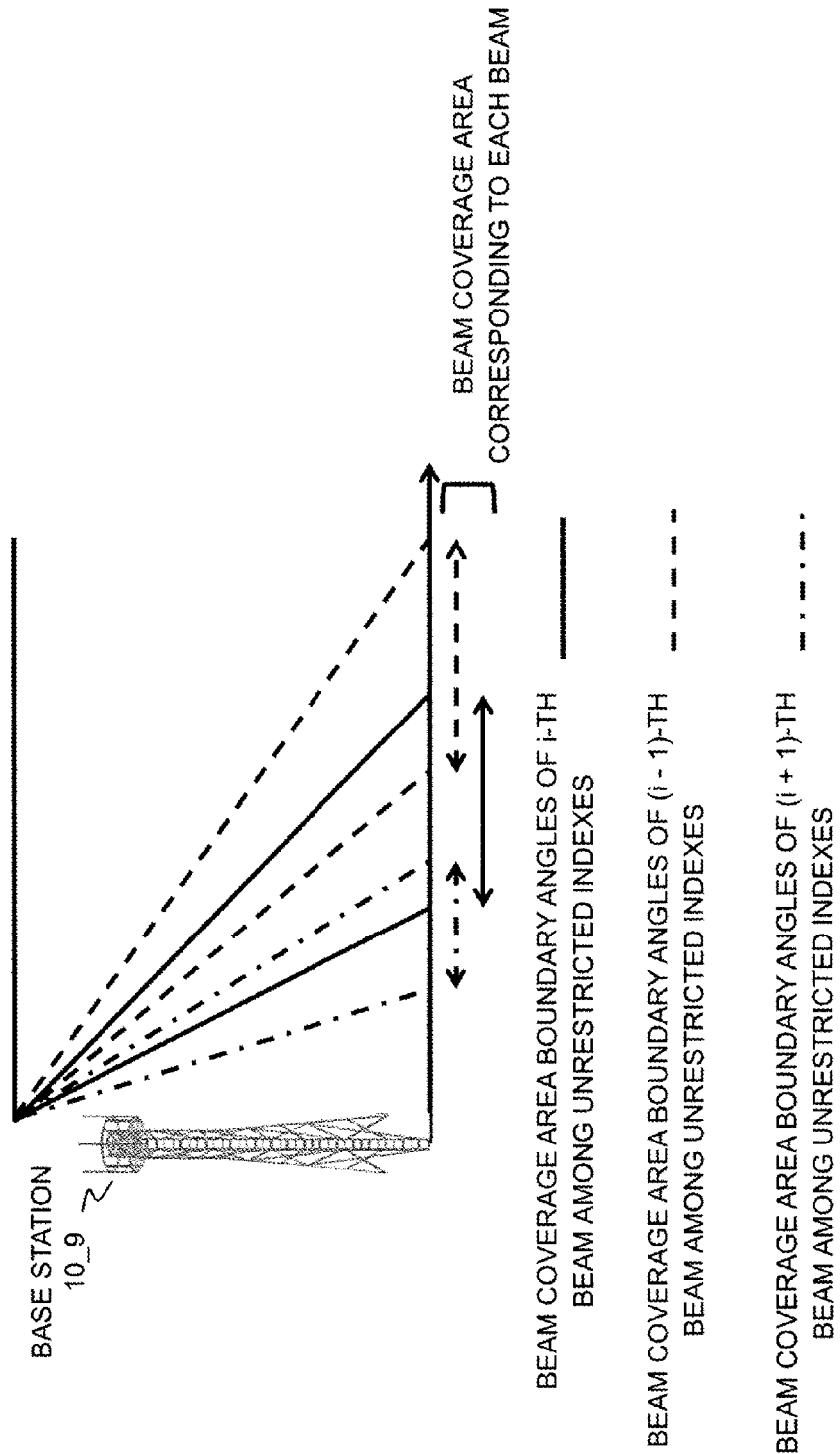
FIG. 25 is a diagram showing a relation between a beam coverage area boundary angle and a beam coverage area in the ninth example.

Referring to FIGS. 24 and 25, first, a beam coverage area is defined for each beam in the superset by using a geometric model.

Referring to FIG. 24, for each beam, angles at which gain attenuates by 3 dB from the peak gain are defined as beam coverage boundary angles, and an area where beams producing higher gains than that gain are radiated is defined as a beam coverage area. For example, referring to FIG. 25, assuming that $\phi_i$ is the beam angle of an i-th beam and that $\Delta\phi_-$ and $\Delta\phi_+$ are angles of a 3 dB attenuation in vertical direction, then an area where among beams, those of [$\phi i+\Delta\phi_-$, $\phi i+\Delta\phi_+$] are irradiated is defined as a vertical-plane beam coverage area.

Figure 26:
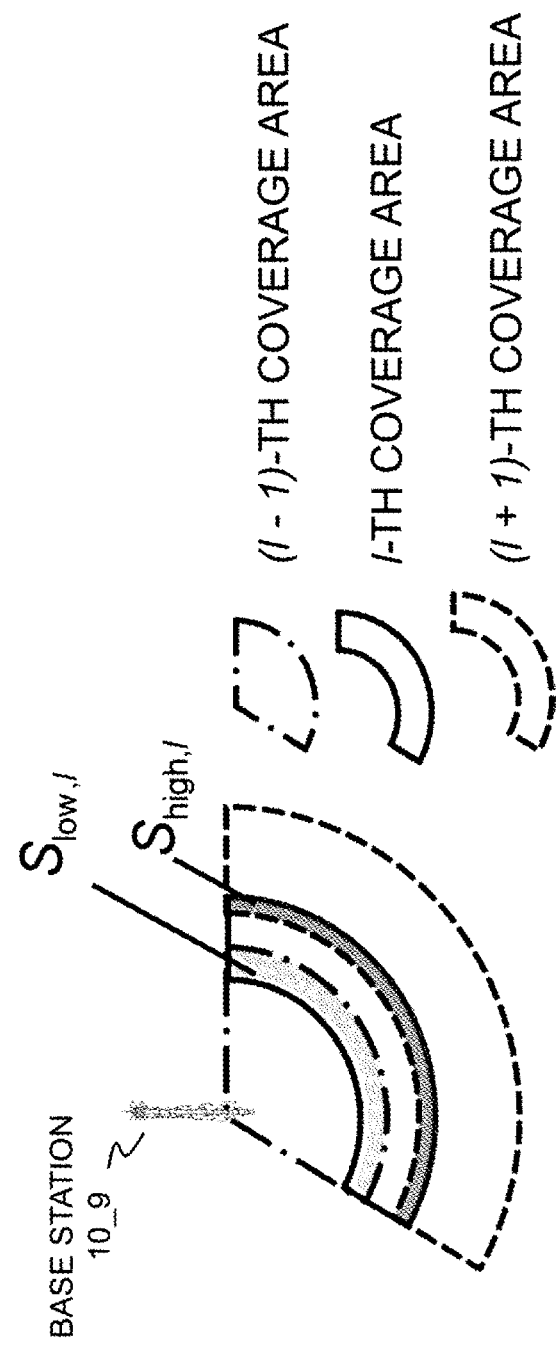
FIG. 26 is a diagram showing a relation between a beam coverage area and a metric in the ninth example.

In horizontal plane, assuming a uniform beam angle, a beam coverage area is the area of a doughnut-shaped range as shown in FIG. 26. Note that a beam coverage area may be calculated taking vertical-plane and horizontal-plane beam gains into consideration at the same time.

Next, the sum of the areas of overlaps between the beam coverage area of an own beam and the beam coverage areas of adjacent beams is calculated as the metric. "Adjacent" in this case refers to being adjacent to an unrestricted index at the time of restriction processing of the repeated index restriction processing, among temporary indexes then assigned in ascending order in the superset.

For example, referring to FIG. 26, metric calculation for an l-th beam coverage area among temporary indexes will be considered. Since adjacent areas to the l-th beam coverage area are (l−1)-th and (l+1)-th areas, the areas of $S_{high, l}$ and $S_{low, l}$ are calculated as the areas of overlaps between the l-th area and the adjacent areas, and then the sum thereof is obtained as the metric. Note that among unrestricted indexes, if a beam coverage area is located the nearest to the cell center or a cell edge and so only have one adjacent beam coverage area, the area of an overlap with that one adjacent beam coverage area is calculated and obtained as the metric.

<Index Restriction>

The index restriction section 902 finds an index in the superset that corresponds to an index having the largest metric, which is acquired from the metric calculation section 901, and makes it a restricted index. In other words, a beam of the largest metric (here, maximizing the areas of overlaps with adjacent areas) is deleted, whereby it is possible to support an arbitrary PMI feedback size, while minimizing a decrease in the coverage area caused along with the reduction of a beam for precoding.

<Determination of the Number of Unrestricted Indexes>

The number-of-unrestricted-indexes determination section 903 calculates the number of unrestricted indexes based on the restricted index acquired from the index restriction section 902, and compares sizes between that number and a total number ($2^{Nfb}$) based on the PMI feedback size Nfb. Here, the number of unrestricted indexes can be obtained by subtracting the number of restricted indexes from the total number of the indexes in the superset. When the number of unrestricted indexes is not larger than $2^{Nfb}$, the unrestricted indexes are output to the index assignment section 106, and the processing is completed. Otherwise, the unrestricted indexes are output to the metric calculation section 901, and the processing as described above is repeated on these unrestricted indexes. When the unrestricted indexes are output from the number-of-unrestricted-indexes determination section 903, the metric calculation section 901 calculates the metric again for precoding matrixes corresponding to the input unrestricted indexes.

As described above, an "adjacent beam coverage area" in the metric calculation is defined within current unrestricted indexes. Accordingly, in the current calculation in which restricted indexes are increased from the previous calculation and indexes included in unrestricted indexes are changed, the metric is calculated after temporary indexes are reassigned to the current group of unrestricted indexes and adjacent beam coverage areas are redefined again. The index restriction section 902 repeats similar processing, and the number-of-unrestricted-indexes determination section 903 combines a restricted index input from the index restriction section 902 and the previously calculated restricted indexes to obtain new restricted indexes. Thereafter, similar processing is performed.

9.3) Operations

Figure 27:
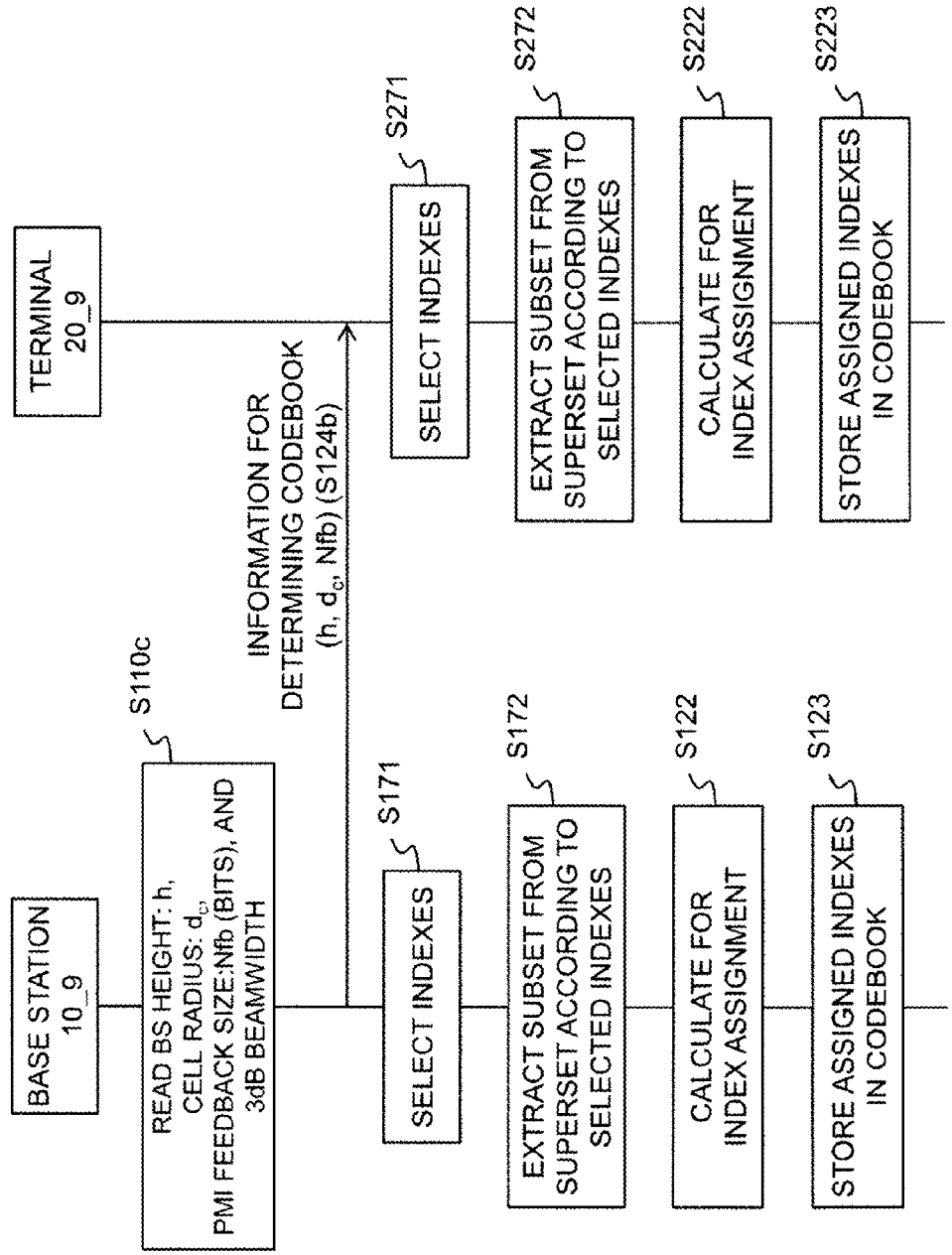
FIG. 27 is a schematic flowchart for describing system operations in the ninth example shown in FIG. 21.

Next, operations of the base station and the terminal in the present example will be described with reference to FIG. 27.

The control section 108 of the base station 10_9 reads the base station height h, cell radius $d_c$, PMI feedback size Nfb, and 3 dB-beamwidth information from the database 102c (Operation S110c), and the index selection section 154 performs the above-described index selection (Operation S171). Subsequently, the subset extraction section 151 extracts a subset (a group of precoding matrixes for a codebook) from the superset in accordance with the selected indexes (Operation S172).

When the group of precoding matrixes $V_i$ for a codebook is thus determined, then as in the fifth example thereafter, the index assignment section 106 assigns i, as codebook indexes, to the group of precoding matrixes $V_i$ extracted by the subset extraction section 151 (Operation S122), and a result of this assignment is stored in the codebook storage section 107 (Operation S123).

Moreover, the control section 108 notifies the base station height h, cell radius $d_c$, and PMI feedback size Nfb read from the database 102c, as information for codebook determination, to the terminal 20_9 (Operation S124b).

When the terminal 20_9 receives the information for codebook determination, the index selection section 254 performs the above-described index selection (Operation S271), as in Operation S171 on the base station 10_9 side. Subsequently, the subset extraction section 251 extracts a subset (a group of precoding matrixes for the codebook) from the superset in accordance with the selected indexes (Operation S272). Subsequently, the control section 205 controls the index assignment section 203 to generate the codebook and stores it in the codebook storage section 204 (Operations S222 and S223), as in Operations S122 and S123 on the base station 10_9 side.

In this manner, the same cell-specific codebook that is stored in the codebook storage section 107 of the base station 10_9 is stored in the codebook storage section 204 of the terminal 20_9. Once the codebook is determined, the control section 205 of the terminal 20_9 uses this codebook to feed back a codebook index (PMI) as channel information to the base station 10_9. The cell-specific codebook is generated such as to meet the PMI feedback size Nfb condition, as described already.

9.4) Effects

According to the ninth example of the present invention, indexes to precoding matrixes for a codebook are selected from the superset in accordance with a cell environment, and a codebook is generated from the group of precoding matrixes corresponding to the selected indexes. Accordingly, the calculation of a beam angle range, a beam angle interval and the like is unrequired, and therefore processing loads can be reduced. Moreover, the base station height h, cell radius $d_c$, and PMI feedback size Nfb, which directly indicate a cell environment, are notified from the base station to the terminal, whereby effects similar to those of the fifth example can be obtained.

10. Tenth Example

According to a tenth example of the present invention, a plurality of codebooks corresponding to different cell environments, respectively, are prepared beforehand, and codebook selection information suitable for a cell environment of a base station is notified to a terminal as information for codebook determination, whereby the codebook reflecting the cell environment of the base station is shared with the terminal. Hereinafter, configurations and operations according to the tenth example will be described.

10.1) System Architecture

Figure 28:
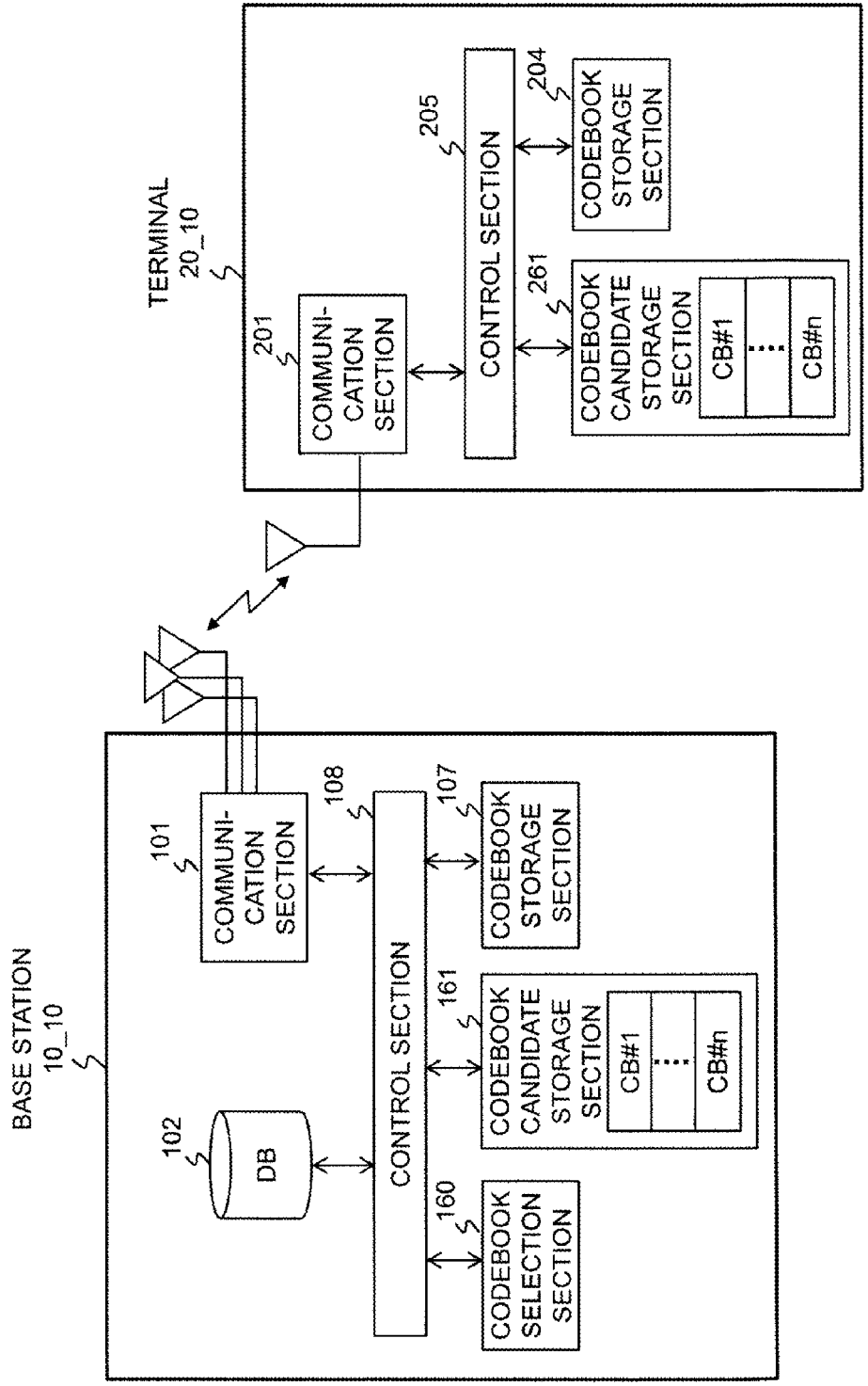
FIG. 28 is a block diagram showing configurations of a base station and a terminal in a wireless communication system according to a tenth example of the present invention.

Referring to FIG. 28, a base station 10_10 according to the tenth example of the present invention includes a communication section 101 for communicating with a terminal, a database 102, a codebook storage section 107, and a control section 108, as in the first example, and the database 102 stores cell environment information including a cell radius $d_c$, a base station height h, and a PMI feedback size Nfb [bit]. The base station 10_10 further includes a codebook selection section 160 and a codebook candidate storage section 161 as a codebook generation means, and the codebook candidate storage section 161 stores a plurality of different codebooks CB #1 to #n beforehand. The plurality of codebooks CB #1 to #n are generated correspondingly to different cell parameters (cell radiuses $d_c$ and base station heights h) through any procedures described in the first to fourth examples above (for example, Operations S110 to S123 in FIG. 5).

A terminal 20_10 includes a communication section 201, a codebook storage section 204, and a control section 205 as in the first example, and further includes a codebook candidate storage section 261 storing the same plurality of codebooks #1 to #n as those of the base station 10_10.

10.2) Operations

Figure 29:
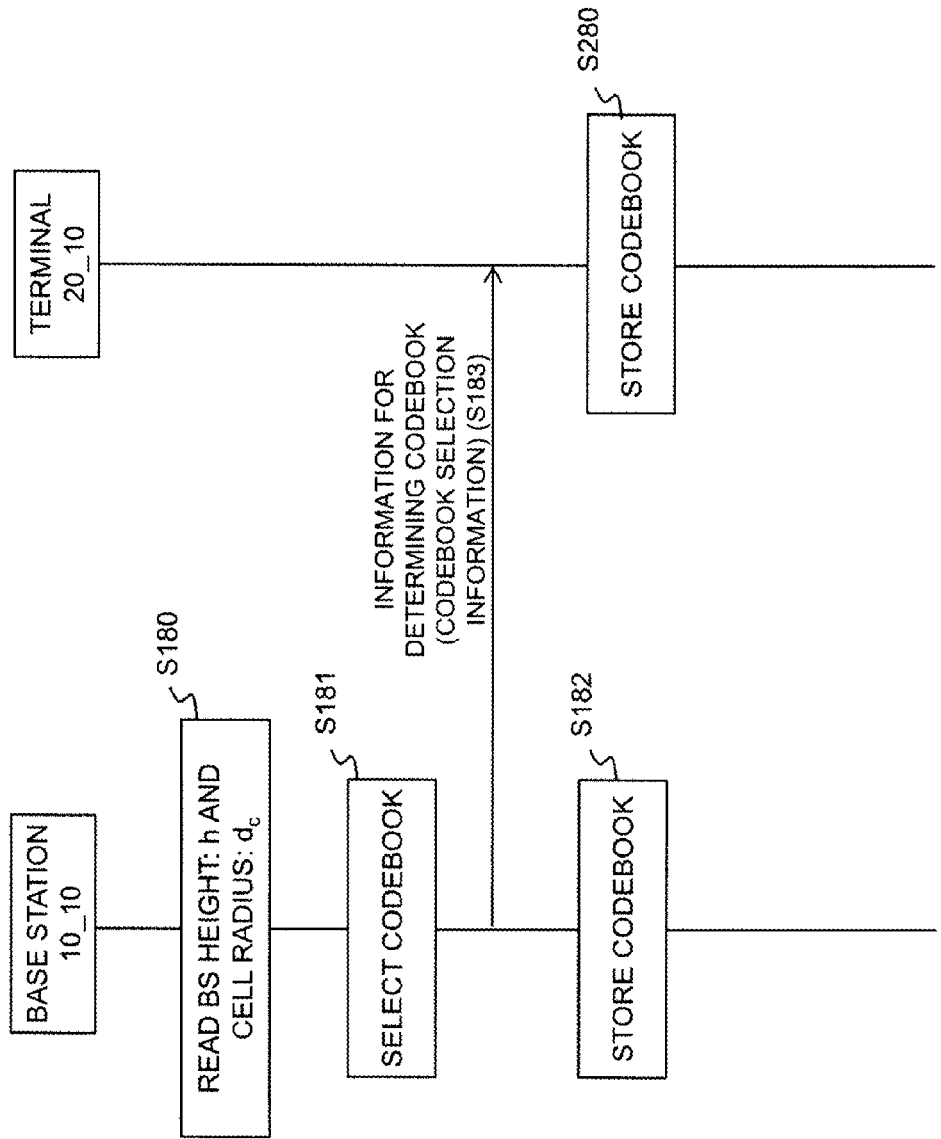
FIG. 29 is a schematic flowchart for describing system operations in the tenth example shown in FIG. 28.

Referring to FIG. 29, the codebook selection section 160 reads the cell radius $d_c$ and base station height h, which are cell-specific parameters, from the database 102 (Operation S180), and searches the codebook candidate storage section 161 by using these cell-specific parameters to select a codebook CB #i corresponding to cell parameters that agree with or are the most similar to the cell-specific parameters (Operation S181). The selected codebook CB #i is stored in the codebook storage section 107 (Operation S182). Subsequently, the control section 108 notifies codebook selection information that specifies the selected codebook #i to the terminal 20_10 as information for codebook determination (Operation S183).

When receiving the codebook selection information, the control section 205 of the terminal 20_10 reads the codebook CB #i specified by this codebook selection information from the codebook candidate storage section 261 and stores it in the codebook storage section 204 (Operation S280).

Note that it is possible that the selection of a codebook is performed when the base station 10_10 is installed, and a result thereof is notified to terminals under the coverage thereof. Thereafter, the reselection of a codebook may be performed at constant intervals or when a change has occurred in the cell environment or system requirements.

10.3) Effects

According to the tenth example of the present invention, a suitable codebook is selected among a plurality of codebooks according to a cell environment of the base station, whereby it is possible to obtain effects similar to those of the first example described above, while reducing the processing loads on the base station and the terminal.

11. Eleventh Example

According to an eleventh example of the present invention, a plurality of supersets corresponding to different cell environments, respectively, are prepared beforehand, and superset selection information and cell environment information suitable for a cell environment of a base station are notified to a terminal as information for codebook determination, whereby the codebook reflecting the cell environment of the base station can also be shared with the terminal. Note that the supersets are as described in the fifth example, and codebook determination procedures using a selected superset are as described in fifth to ninth examples, and therefore a description thereof will be omitted. An example of a system structure according to the eleventh example is shown in FIG. 30.

Figure 30:
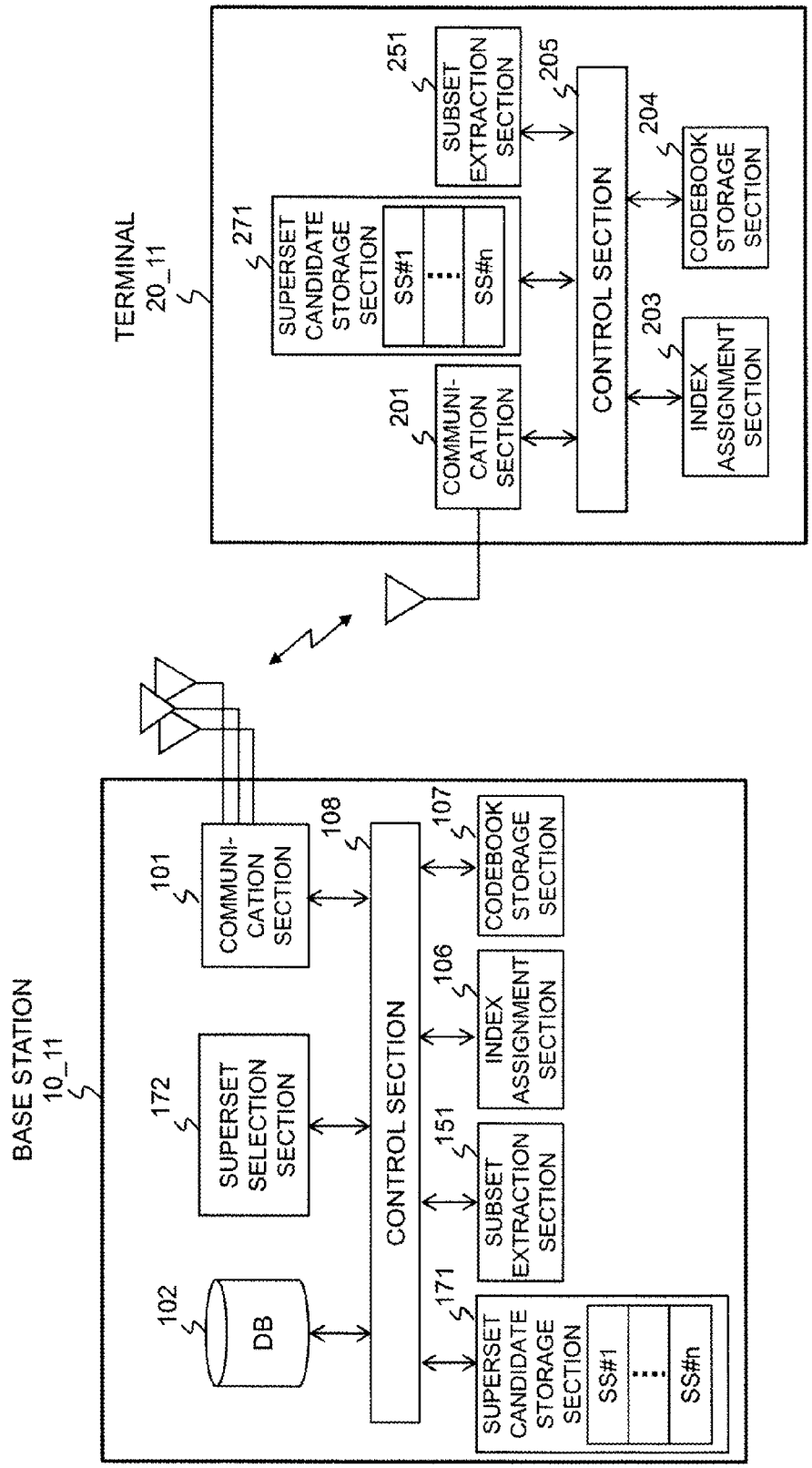
FIG. 30 is a block diagram showing configurations of a base station and a terminal in a wireless communication system according to an eleventh example of the present invention.

Referring to FIG. 30, a base station 10_11 according to the eleventh example of the present invention includes a communication section 101 for communicating with a terminal, a database 102, a subset extraction section 151, an index assignment section 106, a codebook storage section 107, and a control section 108, as in the fifth example, and the database 102 stores cell environment information including a cell radius $d_c$, a base station height h, and a PMI feedback size Nfb [bit]. The base station 10_11 further includes a superset candidate storage section 171 and a superset selection section 172, and the superset candidate storage section 171 stores a plurality of different supersets SS #1 to SS #n beforehand.

Each of the plurality of supersets SS #1 to SS #n has a table structure as shown in FIG. 13, and the supersets SS #1 to SS #n are generated correspondingly to different cell environments. For example, when a base station is installed on a high-rise, or when the periphery of a base station bristles with many buildings, or when neighbor cells are densely present around a base station, a superset for a group of precoding matrices that enlarge beam angles in vertical direction to some extent needs to be prepared to avoid radiating beams outside the cell coverage, or to realize beam radiation onto a limited area within the cell coverage. Moreover, since inter-cell interference increases as beam angles in vertical direction are made smaller, a superset is required in some cases that makes beams radiated onto only those terminals located within the scope of beam angles that can avoid such a situation. By preparing the plurality of supersets SS #1 to SS #n, it is possible to flexibly support such various cell environments or respond to a change in the cell environment.

A terminal 20_11 includes a communication section 201, a subset extraction section 251, an index assignment section 203, a codebook storage section 204, and a control section 205 as in the fifth example, and further includes a superset candidate storage section 271 storing the same plurality of supersets SS #1 to SS #n as those of the base station 10_11.

11.2) Operations

Referring to FIG. 31, the superset selection section 172 reads the cell radius $d_c$ and base station height h, which are cell-specific parameters, from the database 102 (Operation S180), and searches the superset candidate storage section 171 by using these cell-specific parameters to select a superset SS #i corresponding to cell parameters that agree with or are the most similar to the cell-specific parameters (Operation S191). Thereafter, a codebook generated through Operations S161, S122, and S123 as in the fifth example (see FIG. 14) is stored in the codebook storage section 107. Subsequently, the control section 108 notifies SS selection information that specifies the selected superset SS #i and information on the read cell-specific parameters to the terminal 20_10 as information for codebook determination (Operation S192).

When receiving the SS selection information and information on the cell-specific parameters, the control section 205 of the terminal 20_10 reads the superset SS #i specified by this SS selection information from the superset candidate storage section 271, uses this superset SS #i to perform Operations S261, S222, and S223 described in the fifth example, and stores the determined codebook in the codebook storage section 204.

11.3) Effects

According to the eleventh example of the present invention, a suitable superset is selected among a plurality of supersets, according to a cell environment of the base station, whereby it is possible to more flexibly support environments.

12. Others

It is also possible that any base station and any terminal in the above-described first to eleventh examples are provided with CPUs (Central Processing Units) or computers that control the respective operations, which execute programs stored in memories (not shown), whereby functions similar to the above-described respective operations are implemented by software.

INDUSTRIAL APPLICABILITY

The present invention is applicable to mobile communication systems including a base stations and a terminal.

REFERENCE SIGNS LIST

10, 10_1-10_11 Base station
20, 10_1-20_11 Terminal
101 Communication section
102 Database
103 Beam angle range calculation section
104 Beam angle interval calculation section
105 Precoding matrix calculation section
106 Index assignment section
107 Codebook storage section
108 Control section
150 Superset storage section
151 Subset extraction section
154 Index selection section
160 Codebook selection section
161 Codebook candidate storage section
171 Superset candidate storage section
172 Superset selection section
201 Communication section
202 Precoding matrix calculation section
203 Index assignment section
204 Codebook storage section
205 Control section
250 Superset storage section
251 Subset extraction section
254 Index selection section
261 Codebook candidate storage section
271 Superset candidate storage section

The invention claimed is:

1. A terminal apparatus in a communication system in which beam directivity control is performed by precoding using a codebook, comprising:
   a receiver that is configured to receive from a base station information for codebook determination including cell environment information on the base station; and
   a calculator that is configured to calculate cell-specific precoding matrices as a cell-specific codebook shared with the base station based on the cell environment information, wherein the cell environment information is information depending on cell-specific parameters including a height of the base station from a cell surface and a distance on the cell surface from the base station to a cell edge,
   wherein the calculator includes:
   a memory that stores a plurality of cell-specific precoding matrix candidates in accordance with beam angle-related information; and
   a controller that is configured to calculate a coverage area overlap with another beam by using the cell environment information and to generate a predetermined number of cell-specific precoding matrices, by sequentially deleting a cell-specific precoding matrix corresponding to a beam of interest in descending order of size of the coverage area overlap.

2. The terminal apparatus according to claim 1, wherein the calculator calculates the cell-specific precoding matrices based on beam angle-related information that depends on the cell-specific parameters.

3. The terminal apparatus according to claim 2, wherein the calculator calculates a beam angle range and a beam angle interval as the beam angle-related information from the cell-specific parameters and calculates the cell-specific precoding matrices using the beam angle range and the beam angle interval.

4. The terminal apparatus according to claim 3, wherein the beam angle range ($\phi r$) is calculated by $\phi r = \phi_{max} - \phi_{min}$, where $\phi_{max}$ is an upper limit of the beam angle, $\phi_{min}$ is calculated by $$\phi_{min} = \arctan\left(\frac{h}{d_c}\right)$$

where h is the height of the base station from the cell surface and $d_c$ is the distance on the cell surface from the base station to the cell edge, and the beam angle interval $\Delta\phi$ is calculated by $$\Delta\phi = \frac{(\phi_{max} - \phi_{min})}{2^{N_{fb}} - 1}$$

where $N_{fb}$ is a precoding matrix indicator (PMI) feedback size.

5. A base station apparatus in a communication system in which beam directivity control is performed by precoding using a codebook, comprising:

a transmitter that is configured to send information for codebook determination including cell environment information on the base station apparatus to a terminal; and a calculator that is configured to calculate cell specific precoding matrices as a cell-specific codebook shared with the terminal based on the cell environment information, wherein the cell environment information is information depending on cell-specific parameters including a height of the base station from a cell surface and a distance on the cell surface from the base station to a cell edge, wherein the calculator includes:

a memory that stores a plurality of cell-specific precoding matrix candidates in accordance with beam angle-related information; and a controller that is configured to calculate a coverage area overlap with another beam by using the cell environment information and to generate a predetermined number of cell-specific precoding matrices, by deleting a cell-specific precoding matrix corresponding to a beam of interest in descending order of size of the coverage area overlap.

6. The base station apparatus according to claim 5, wherein the calculator calculates the cell-specific precoding matrices based on beam angle-related information that depends on the cell-specific parameters.

7. The base station apparatus according to claim 6, wherein the calculator calculates a beam angle range and a beam angle interval as the beam angle-related information from the cell-specific parameters and calculates the cell-specific precoding matrices using the beam angle range and the beam angle interval.

8. The base station apparatus according to claim 7, wherein the beam angle range ($\phi r$) is calculated by $\phi r = \phi_{max} - \phi_{min}$, where $\phi_{max}$ is an upper limit of the beam angle, $\phi_{min}$ is calculated by $$\phi_{min} = \arctan\left(\frac{h}{d_c}\right)$$

where h is the height of the base station from the cell surface and $d_c$ is the distance on the cell surface from the base station to the cell edge, and the beam angle interval $\Delta\phi$ is calculated by $$\Delta\phi = \frac{(\phi_{max} - \phi_{min})}{2^{N_{fb}} - 1}$$

where $N_{fb}$ is a precoding matrix indicator (PMI) feedback size.

9. A codebook sharing method of a wireless communication apparatus in a communication system in which beam directivity control is performed by precoding using a codebook, comprising:

receiving from a base station information for codebook determination including cell environment information on the base station;

calculating cell-specific precoding matrices as a cell-specific codebook shared with the base station based on the cell environment information, wherein the cell environment information is information depending on cell-specific parameters including a height of the base station from a cell surface and a distance on the cell surface from the base station to a cell edge;

storing a plurality of cell-specific precoding matrix candidates in accordance with beam angle-related information;

calculating a coverage area overlap with another beam by using the cell environment information; and generating a predetermined number of cell-specific precoding matrices, by sequentially deleting a cell-specific precoding matrix corresponding to a beam of interest in descending order of size of the coverage area overlap.

10. A codebook sharing method of a wireless communication apparatus in a communication system in which beam directivity control is performed by precoding using a codebook, comprising:

sending information for codebook determination including cell environment information on the wireless communication apparatus to a wireless terminal;

calculating cell-specific precoding matrices as a cell-specific codebook shared with the wireless terminal based on the cell environment information, wherein the cell environment information is information depending on cell-specific parameters including a height of the base station from a cell surface and a distance on the cell surface from the base station to a cell edge;

storing a plurality of cell-specific precoding matrix candidates in accordance with beam angle-related information;

calculating a coverage area overlap with another beam by using the cell environment information; and generating a predetermined number of cell-specific precoding matrices, by deleting a cell-specific precoding matrix corresponding to a beam of interest in descending order of size of the coverage area overlap.

11. A non-transitory recording medium which stores a program causing a computer to function as a wireless communication apparatus in a communication system in which beam directivity control is performed by precoding using a codebook, causing the computer to implement the functions of:

receiving from a base station information for codebook determination including cell environment information on the base station;

calculating cell-specific precoding matrices as a cell-specific codebook shared with the base station based on the cell environment information, wherein the cell environment information is information depending on cell-specific parameters including a height of the base station from a cell surface and a distance on the cell surface from the base station to a cell edge;

storing a plurality of cell-specific precoding matrix candidates in accordance with beam angle-related information;

calculating a coverage area overlap with another beam by using the cell environment information; and generating a predetermined number of cell-specific precoding matrices, by sequentially deleting a cell-specific precoding matrix corresponding to a beam of interest in descending order of size of the coverage area overlap.

12. A non-transitory recording medium which stores a program causing a computer to function as a wireless communication apparatus in a communication system in which beam directivity control is performed by precoding using a codebook, causing the computer to implement the functions of:

sending information for codebook determination including cell environment information on the wireless communication apparatus to a wireless terminal;

calculating cell-specific precoding matrices as a cell-specific codebook shared with the wireless terminal based on the cell environment information, wherein the cell environment information is information depending on cell-specific parameters including a height of the base station from a cell surface and a distance on the cell surface from the base station to a cell edge;

storing a plurality of cell-specific precoding matrix candidates in accordance with beam angle-related information; calculating a coverage area overlap with another beam by using the cell environment information; and generating a predetermined number of cell-specific precoding matrices, by deleting a cell-specific precoding matrix corresponding to a beam of interest in descending order of size of the coverage area overlap.

* * * * *